(12) United States Patent
MacDonald et al.

(10) Patent No.: US 11,590,705 B2
(45) Date of Patent: Feb. 28, 2023

(54) SYSTEM AND METHOD FOR ADDITIVELY MANUFACTURING AN OBJECT

(71) Applicant: The Boeing Company, Chicago, IL (US)

(72) Inventors: Elaine MacDonald, Wildwood, MO (US); Daniel J. Braley, St. Peters, MO (US)

(73) Assignee: The Boeing Company, Arlington, VA (US)

(*) Notice: Subject to any disclaimer, the term of this patent is extended or adjusted under 35 U.S.C. 154(b) by 66 days.

(21) Appl. No.: 15/930,646

(22) Filed: May 13, 2020

(65) Prior Publication Data

US 2021/0354387 A1 Nov. 18, 2021

(51) Int. Cl.
| | |
|---|---|
| *B29C 64/336* | (2017.01) |
| *B29C 64/153* | (2017.01) |
| *B29C 64/393* | (2017.01) |
| *B29C 64/214* | (2017.01) |
| *B29C 64/314* | (2017.01) |
| *B29C 64/218* | (2017.01) |
| *B33Y 10/00* | (2015.01) |
| *B33Y 30/00* | (2015.01) |
| *B33Y 50/02* | (2015.01) |
| *B29C 64/329* | (2017.01) |

(Continued)

(52) U.S. Cl.
CPC .......... *B29C 64/336* (2017.08); *B22F 10/00* (2021.01); *B29C 64/153* (2017.08); *B29C 64/214* (2017.08); *B29C 64/218* (2017.08); *B29C 64/314* (2017.08); *B29C 64/329* (2017.08); *B29C 64/393* (2017.08); *B33Y 10/00* (2014.12); *B33Y 30/00* (2014.12); *B33Y 50/02* (2014.12); *B22F 10/10* (2021.01)

(58) Field of Classification Search
USPC .......................................................... 264/497
See application file for complete search history.

(56) References Cited

U.S. PATENT DOCUMENTS

| | | | |
|---|---|---|---|
| 5,555,481 A | 9/1996 | Rock et al. | |
| 7,045,738 B1 * | 5/2006 | Kovacevic | B29C 64/329 219/121.64 |

(Continued)

FOREIGN PATENT DOCUMENTS

| | | |
|---|---|---|
| EP | 3 135 407 | 3/2017 |
| WO | WO 2018/197876 | 11/2018 |

OTHER PUBLICATIONS

Joris Peels: "Interview with Kevin Eckes of Selective Powder Deposition Firm Aerosint," 3D Printing, Exclusive Interviews, https://3dprint.cm/229431/interview-with-Kevin-eckes-of-selective-powder-deposition-firm-aerosint/ (Nov. 8, 2018).

(Continued)

*Primary Examiner* — Matthew J Daniels
*Assistant Examiner* — Gregory C. Grosso
(74) *Attorney, Agent, or Firm* — Walters & Wasylyna LLC

(57) ABSTRACT

A method of additively manufacturing an object includes steps of: (1) successively forming a plurality of powder layers by depositing powder; (2) selectively controlling a composition of the powder that forms each one of the plurality of powder layers; and (3) successively forming a plurality of object layers of the object by joining the powder of a portion of each one of the plurality of powder layers before forming each successive one of the plurality of powder layers.

20 Claims, 12 Drawing Sheets

(51) Int. Cl.
*B22F 10/00* (2021.01)
*B22F 10/10* (2021.01)

(56) References Cited

U.S. PATENT DOCUMENTS

| | | |
|---|---|---|
| 9,101,979 B2 | 8/2015 | Hofman et al. |
| 2014/0099476 A1 | 4/2014 | Subramanian et al. |
| 2016/0074938 A1* | 3/2016 | Kitani .................. B23K 26/342 |
| | | 219/76.12 |
| 2017/0057013 A1* | 3/2017 | Gillespie ................. B22F 10/20 |
| 2017/0072471 A1 | 3/2017 | Welch et al. |
| 2017/0165910 A1 | 6/2017 | Dinardo |
| 2019/0030608 A1 | 1/2019 | Ott et al. |
| 2019/0240902 A1 | 8/2019 | Bedoret et al. |
| 2020/0189001 A1* | 6/2020 | Zhang .................... B33Y 10/00 |
| 2020/0362462 A1 | 11/2020 | Braley et al. |
| 2021/0154910 A1* | 5/2021 | Cheng .................. B29C 64/232 |

OTHER PUBLICATIONS

European Patent Office, Extended European Search Report, App. No. 21161858.2 (dated Aug. 25, 2021).
European Patent Office, "Communication pursuant to Article 94(3) EPC," App. No. 21 161 858.2 (dated Aug. 29, 2022).

* cited by examiner

SYSTEM AND METHOD FOR ADDITIVELY MANUFACTURING AN OBJECT

FIELD

The present disclosure relates generally to additive manufacturing and, more particularly, to systems and methods for powder-bed additively manufacturing and, more particularly, to powder-bed additively manufacturing systems and methods used to make an object having a compositional gradient.

BACKGROUND

Additive manufacturing, also referred to as layered manufacturing and 3D printing, is a process of joining materials to make objects as opposed to subtractive manufacturing. Additive manufacturing has a wide variety of applications from rapid prototyping to fabrication of end-use products. On a basic level, additive manufacturing technologies are based on the concept of building up material in a cross-sectional, layer-by-layer manner to form a 3D object. Common to additive manufacturing technologies is the use of 3D modeling software (Computer Aided Design or CAD), machine equipment, and layering material. Once a CAD model is produced, the machine equipment reads in data from the CAD file and uses successive layers of a desired layering material to fabricate the 3D object.

One category of additive manufacturing is powder bed additive manufacturing. Powder bed additive manufacturing employs a powder bed to join layers of powder in additive steps to produce the 3D object. In powder bed additive manufacturing, a layer of powder in the powder bed is joined to an underlying layer of the object to add a new layer to the object. A new layer of powder is deposited in the powder bed and over the previously formed layer of the object, and the new layer of powder is similarly joined to the object. The depositing-and-joining procedure is repeated a number of times to produce a plurality of layers on the object to, ultimately, form the object.

Additive manufacturing has certain advantages over traditional manufacturing techniques. Unlike traditional manufacturing techniques, additive manufacturing provides increased design freedom and is not limited by geometric constraints. Additive manufacturing may also simplify and reduce the costs associated with manufacturing an object as compared to traditional manufacturing techniques. However, additive manufacturing has some disadvantages. For example, in powder bed additive manufacturing, a large amount of powder in the powder bed is not used to form the object. This unused powder either accounts for wasted material or must be collected and recycled. Additionally, conventional powder bed additive manufacturing techniques may not be suited to manufacture an object that has a compositional gradient. Accordingly, those skilled in the art continue with research and development efforts to provide improved additive manufacturing techniques, such as powder bed additive manufacturing.

SUMMARY

The following is a non-exhaustive list of examples, which may or may not be claimed, of the subject matter according to the present disclosure.

In an example, a disclosed method of additively manufacturing an object includes steps of: (1) successively forming a plurality of powder layers by depositing powder; (2) selectively controlling a composition of the powder that forms each one of the plurality of powder layers; and (3) successively forming a plurality of object layers of the object by joining the powder of a portion of each one of the plurality of powder layers before forming each successive one of the plurality of powder layers.

In an example, a disclosed method of additively manufacturing an object includes steps of: (1) producing a plurality of powders, wherein each one of the plurality of powders has a different composition; (2) depositing the plurality of powders to form a plurality of sections of a powder layer, wherein each one of the plurality of sections is formed by one of the plurality of powders; and (3) joining at least a portion of each one of the plurality of sections of the powder layer to form an object layer of the object.

In an example, a disclosed powder-deposition apparatus for an additive-manufacturing system includes a recoater configured to discharge powder such that a powder layer is formed from the powder. The powder-deposition apparatus also includes a mixer configured to mix a plurality of powder constituents to produce the powder and to dispense the powder to the recoater. The powder-deposition apparatus further includes a powder feeder configured to selectively dispense each one of the plurality of powder constituents to the mixer such that a composition of the powder is selectively controlled by a mass of each one of the plurality of powder constituents that is selectively dispensed from the powder feeder.

Other examples of the disclosed system and method will become apparent from the following detailed description, the accompanying drawings, and the appended claims.

DETAILED DESCRIPTION

Figure 1:
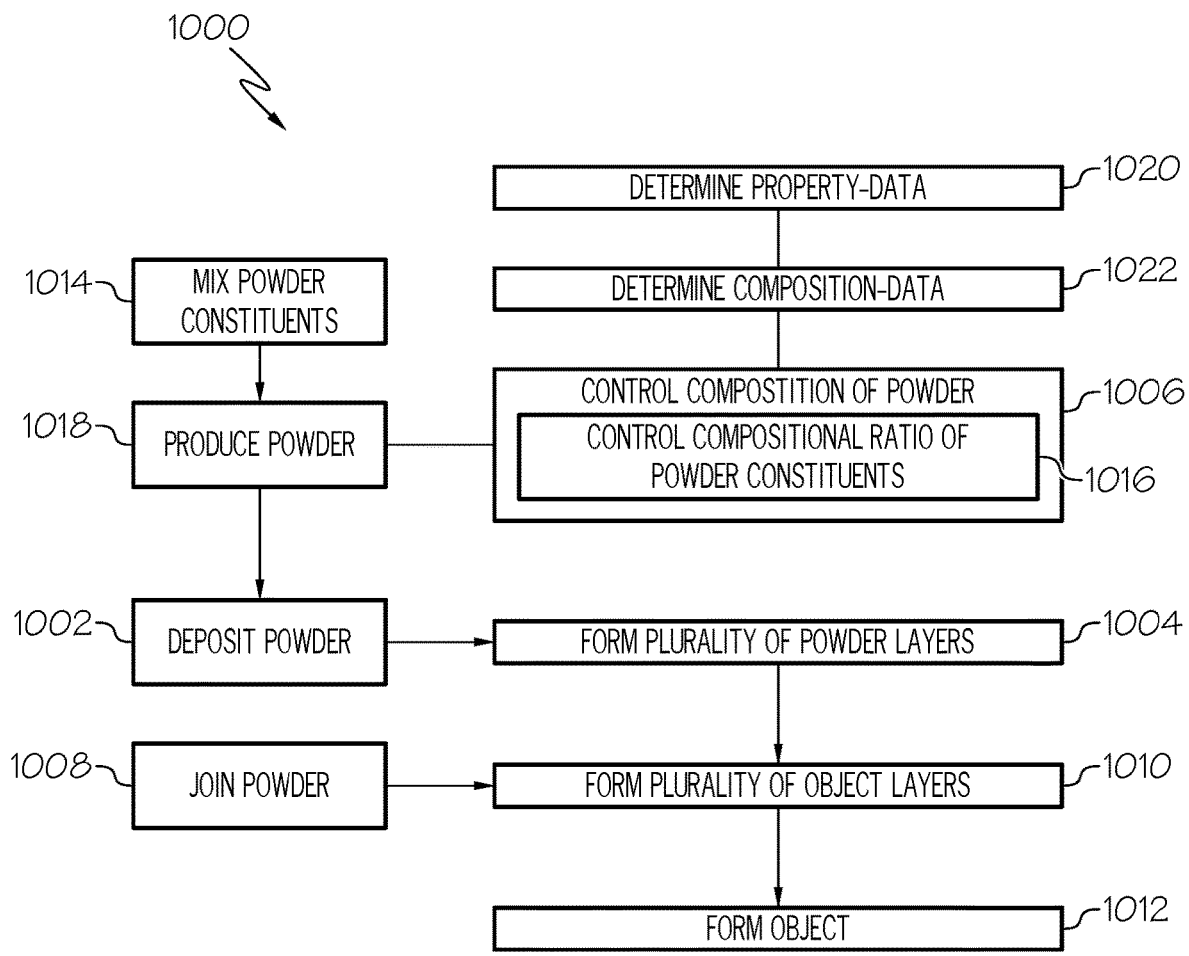
FIG. 1 is a flow diagram of an example of a method of additively manufacturing an object.

The following detailed description refers to the accompanying drawings, which illustrate specific examples of the subject matter disclosed herein. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter disclosed herein are provided below. Reference herein to "example" means that one or more feature, structure, element, component, characteristic, and/or operational step described in connection with the example is included in at least one aspect, embodiment, and/or implementation of the subject matter disclosed herein. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Referring generally to FIGS. 1-13, by way of examples, the present disclosure is directed to a method 1000 of additively manufacturing an object 100 and an additive manufacturing system 200 used to additively manufacture the object 100. According to one or more examples, the method 1000 utilizes the additive manufacturing system 200. In particular, the method 1000 and the additive manufacturing system 200 are implementations of a powder bed additive manufacturing process used to make the object 100.

The object 100 refers to an object made using the additive manufacturing system 200 and method 1000 and includes any article, part, component, or other three-dimensional structure that is manufacturing by the powder bed additive manufacturing process.

The present disclosure recognizes there are advantages to providing an object that has a compositional gradient in one or more axial directions. The present disclosure also recognizes it may be difficult to form the object having a compositional gradient using conventional manufacturing techniques. One or more examples of the additive manufacturing system 200 and the method 1000 provide techniques to selectively produce a powder gradient in one or more powder layers, which results in the object 100 having a compositional gradient that can be tailored based on a desired physical property, chemical property, electrical property, thermal property, and/or magnetic property within the object 100.

Referring to FIG. 1, in one or more examples, the method 1000 includes a step of (block 1002) depositing powder 102 in a powder bed 114. The method 1000 also includes a step of (block 1004) successively forming a plurality of powder layers 104 by depositing the powder 102. The method 1000 further includes a step of (block 1006) selectively controlling a composition of the powder 102 that forms each one of the plurality of powder layers 104. Throughout the present disclosure, the plurality of powder layers 104 may be referred to individually as powder layer 104-1 through powder layer 104-N.

The method 1000 also includes a step of (1008) joining the powder 102 of a portion of each one of the plurality of powder layers 104. The method 1000 further includes a step of (block 1010) successively forming a plurality of object layers 112 of the object 100 by joining the powder 102 of a portion of each one of the plurality of powder layers 104 before forming each successive one of the plurality of powder layers 104. Throughout the present disclosure, the plurality of object layers 112 may be referred to individually as object layer 112-1 through object layer 112-N.

According to the method 1000, the operational steps of depositing-and-joining the powder may be repeated a number of times to successively form the plurality of powder layers 104, to successively form the plurality of object layers 112, and to, ultimately, form the object 100 (block 1012).

Referring to FIG. 2-5, the additive manufacturing system 200 includes a powder-deposition apparatus 202. The powder-deposition apparatus 202 is configured to selectively deposit the powder 102 in the powder bed 114 to successively form each one of the plurality of powder layers 104. According to the method 1000, in one or more examples, the step of (block 1002) depositing the powder 102 and the step of (1004) successively forming the plurality of powder layers 104 is performed using the powder-deposition apparatus 202. According to the method 1000, in one or more examples, the step of (block 1006) selectively controlling the composition of the powder 102 that forms each one of the plurality of powder layers 104 is performed using the powder-deposition apparatus 202.

In one or more examples, the additive manufacturing system 200 also includes a powder-joining apparatus 218. The powder-joining apparatus 218 is configured to selectively join the powder 102 of a portion of each one of the powder layers 104 to successively form each one of the plurality of object layers 112. According to the method 1000, in one or more examples, the step of (block 1008) joining the powder 102 and the step of (block 1006) successively forming the plurality of object layers 112 is performed using the powder-joining apparatus 218.

According to the method 1000, in one or more examples, the additive manufacturing system 200 is configured to convert a three-dimensional (3D) model into two-dimensional (2D) layers. The additive manufacturing system 200 utilizes a computer numerical control (CNC) accumulation process to selectively deposit and join the powder 102, according to a preprogrammed construction shape of each 2D layer and a preprogrammed tool path (e.g., G-code).

In one or more examples, the step of (block 1008) joining the powder 102 includes a step of fusing the powder 102 of a portion of each one of the plurality of powder layers 104 to successively form each one of the plurality of object layers 112 before forming each successive one of the plurality of powder layers 104. In one or more examples, the powder 102 is fused using an energy beam.

In one or more examples, the powder-joining apparatus 218 includes a directed energy device. The directed energy device is configured to generate the energy beam and direct the energy beam towards the powder 102. The energy beam is suitable to fuse the powder of a portion of each one of the plurality of powder layers 104 to form a solid cross-sectional layer of the object 100 (e.g., one of the plurality of object layers 112).

Examples of the method 1000 and the additive manufacturing system 200 that utilize the directed energy device to fuse the powder 102 include direct metal laser sintering (DMLS), direct metal laser fusion (DMLF), selective laser sintering (SLS), selective laser fusion (SLF), and electron beam melting (EBM). In these processes, the directed energy device (e.g., a laser beam generator or electron beam generator) is used to apply the energy beam (e.g., laser beam or electron beam) that melts or sinters the powder 102, which cools into a solid layer of material. The type fusing process, the type of directed energy device used, and/or the type of energy beam used to fuse the powder 102 may depend of various factors, such as, but not limited to, the composition of the powder 102, the object 100 being made, and the like.

In one or more examples, the step of (block 1008) joining the powder 102 includes a step of bonding the powder 102 of a portion of each one of the plurality of powder layers 104 to successively form each one of the plurality of object layers 112 before forming each successive one of the plurality of powder layers 104. In one or more examples, the powder 102 is bonded using a binder.

In one or more examples, the powder-joining apparatus 218 includes a binder-delivery device. The binder-delivery device is configured to deposit the binder on the powder 102. The binder is suitable to bond the powder 102 to form a solid cross-sectional layer of the object 100 (e.g., one of the plurality of object layers 112).

An example of the method 1000 and the additive manufacturing system 200 that utilizes the binder-delivery device to bond the powder 102 includes binder jetting. In this process, the binder-delivery device (e.g., an inkjet print head) is used to apply the binder (e.g., a binding agent) that bonds the powder 102 into a solid layer of material. After the object 100 is fully formed, the object 100 is encapsulated in a non-joined portion of the powder 102 and is left to cure and gain strength. In one or more examples, a post-processing step may be required. For example, the object 100 may need to be heat treated to improve mechanical properties and/or reduce porosity.

In one or more examples, the additive manufacturing system 200 includes a build chamber 220 and a build platform 222 in the build chamber 220. For the purpose of illustration, a front wall (or front rail) of the build chamber 220 is omitted in FIGS. 2-5. The build platform 222 is provided to support a powder bed 114 and the object 100 (FIG. 5) made via the powder bed additive manufacturing process. The build chamber 220 provides a peripheral boundary to the build platform 222 a peripheral boundary to the powder bed 114.

In one or more examples, a seal (not shown) is in contact with the build platform 222 and the build chamber 220 to ensure that the powder 102 remains in the build chamber 220 during formation of the object 100.

While the illustrative examples depict the build chamber 220 and the build platform 222 as having a square shape in transverse cross-section, in other examples, the build chamber 220 and the build platform 222 may have any geometric shape with a closed cross section, such as a circular shape, an elliptical shape, a rectangular shape, and the like.

In one or more examples, the build platform 222 is movable relative to the powder-deposition apparatus 202 and the powder-joining apparatus 218. In one or more examples, the build platform 222 moves vertically (e.g., is lowered) within the build chamber 220 relative to the powder-deposition apparatus 202 and the powder-joining apparatus 218 as successive ones of the plurality of powder layers 104 and plurality of object layers 112 are formed. In one or more examples, the build platform 222 moves horizontally relative to the powder-deposition apparatus 202 as each successive one of the plurality of powder layers 104 is formed and/or relative to the powder-joining apparatus 218 as each successive one of the plurality of object layers 112 is formed. In one or more examples, the build platform 222 rotates about a vertical axis relative to the powder-deposition apparatus 202 as each one of the plurality of powder layers 104 is formed and/or relative to the powder-joining apparatus 218 as each one of the plurality of object layers 112 is formed.

In one or more examples, the additive manufacturing system 200 includes a build-platform actuator 224 coupled to the build platform 222 and configured to drive movement of the build platform 222. In one or more examples, the build-platform actuator 224 includes, or takes the form of, a linear actuator. In one or more examples, the build-platform actuator 224 includes a turntable coupled to the build platform 222.

In one or more examples, the powder-deposition apparatus 202 is movable relative to the build platform 222. In one or more examples, the powder-deposition apparatus 202 moves vertically (e.g., is raised) relative to the build platform 222 as each successive one of the plurality of powder layers 104 is formed. In one or more examples, the powder-deposition apparatus 202 moves horizontally relative to the build platform 222 as each successive one of the plurality of powder layers 104 is formed. In one or more examples, the powder-deposition apparatus 202 has multiple degrees of freedom to accommodate multi-axis movement for depositing the powder 102 on the build platform 222.

In one or more examples, the additive manufacturing system 200 includes a powder-deposition actuator 226 coupled to the powder-deposition apparatus 202 and configured to drive movement of the powder-deposition apparatus 202. In one or more examples, the powder-deposition actuator 226 includes, or takes the form of, a linear actuator, a robotic actuator arm (e.g., a six-axis robotic actuator arm), and the like.

In one or more examples, the powder-joining apparatus 218 is movable relative to the build platform 222. In one or more examples, the powder-joining apparatus 218 moves vertically (e.g., is raised) relative to the build platform 222 as each successive one of the plurality of object layers 112 is formed. In one or more examples, the powder-joining apparatus 218 moves horizontally relative to the build platform 222 as each successive one of the plurality of object layers 112 is formed. In one or more examples, the powder-joining apparatus 202 has multiple degrees of freedom to accommodate multi-axis movement for joining the powder 102 at any location on the build platform 222.

In one or more examples, the additive manufacturing system 200 includes a powder-joining actuator 228 coupled to the powder-joining apparatus 218 and configured to drive movement of the powder-joining apparatus 218. In one or more examples, the powder-joining actuator 228 includes, or takes the form of, a linear actuator, a robotic actuator arm (e.g., a six-axis robotic actuator arm), and the like.

In one or more examples, the additive manufacturing system 200 includes a controller 250. The controller 250 is in communication with operational components of the additive manufacturing system 200 via one or more communication lines, such as via wired communication and/or wireless communication. In one or more examples, the controller 250 is configured to generate command signals to control operation of the powder-deposition apparatus 202 and the powder-joining apparatus 218. For example, the controller 250 selectively controls movement of the powder-deposition apparatus 202 and the powder-joining apparatus 218 according to a predetermined plan (e.g., G-code), stored in the controller 250, to successively deposit-and-join the powder 102. In one or more examples, the controller 250 is also configured to selectively control the composition of the powder 102, such as, by adjusting a compositional ratio of constituents forming the powder 102 dispensed at different locations according to the predetermined plan, stored in the controller 250.

In one or more examples, the additive manufacturing system 200 includes a power source 252. The power source 252 is configured to provide power to the components of the additive manufacturing system 200, as required. In one or more examples, the power source 252 may be a single power source or may include a plurality of power sources working together to provide the necessary power output. Alternatively, the plurality of power sources may operate independently and may individually supply power to particular components of the additive manufacturing system 200. The power source 252 may be either an AC or a DC power source or may utilize a combination of AC and DC.

Figure 3:
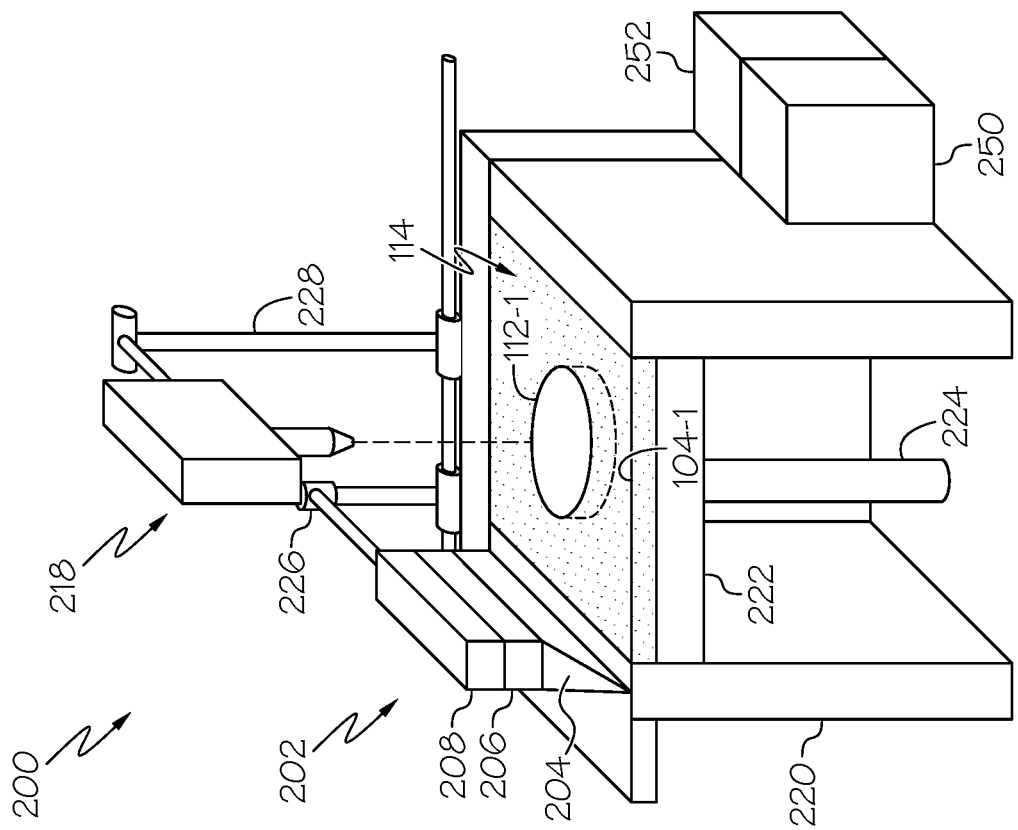
FIG. 3 is a schematic illustration of an example of the additive manufacturing system, in which an object layer is formed.
Figure 2:
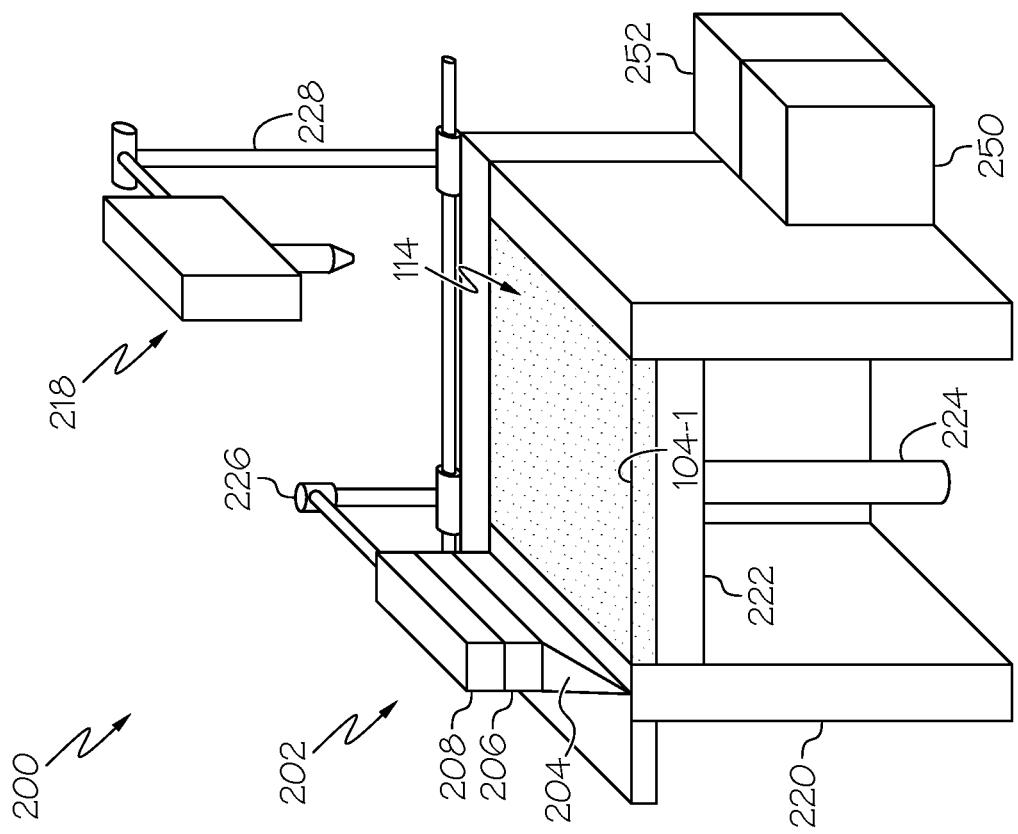
FIG. 2 is a schematic illustration of an example of an additive manufacturing system, in which a powder layer is formed.

In one or more examples, under direction from the controller 250, the powder-deposition apparatus 202 selectively controls the composition of the powder 102. As illustrated in FIG. 2, under direction from the controller 250, the powder-deposition apparatus 202 traverses the build platform 222 and deposits the powder 102, having the selectively controlled composition, to form a first powder layer 104-1 (a first one of the plurality of powder layers 104). As illustrated in FIG. 3, after the first powder layer 104-1 is deposited, the powder-joining apparatus 218 is activated and traverses the build platform 222, under direction from the controller 250, to join a selected portion of the powder 102 and form a first object layer 112-1 (a first one of the plurality of object layers 112) of the object 100 on the build platform 222. After formation of the first object layer 112-1, the non-joined portion of the powder 102 remains packed around the first object layer 112-1.

Figure 4:
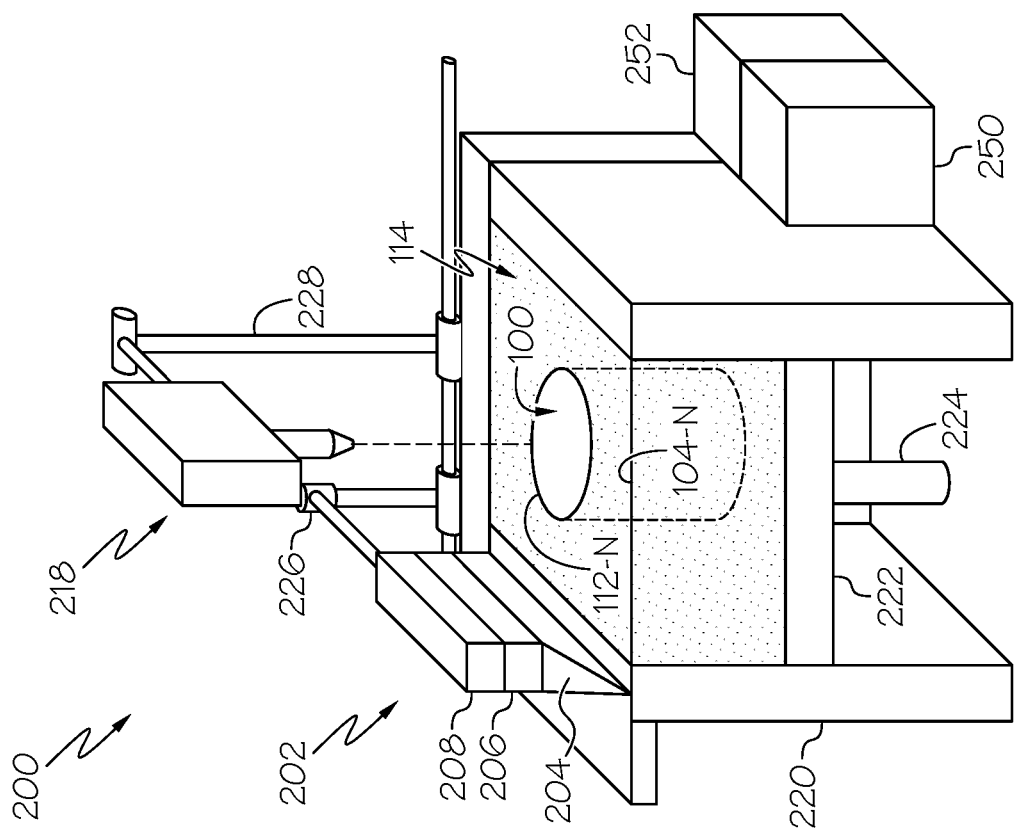
FIG. 4 is a schematic illustration of an example of the additive manufacturing system, in which a second powder layer is formed on the underlying powder layer and object layer.

Under direction from the controller 250, the build platform 222 is indexed down by one layer of thickness. As illustrated in FIG. 4, under direction from the controller 250, the powder-deposition apparatus 202 traverses the build platform 222 and deposits the powder 102, having the selectively controlled composition, to form a second powder layer 104-2 (a successive second one of the plurality of powder layers 104). After the second powder layer 104-2 is deposited, the powder-joining apparatus 218 is activated and traverses the build platform 222, under direction from the controller 250, to join a selected portion of the powder 102 and form a second object layer (a successive second one of the plurality of object layers 112). After formation of the second object layer, the non-joined portion of the powder 102 remains packed around the first object layer 112-1 and the second object layer.

Figure 5:
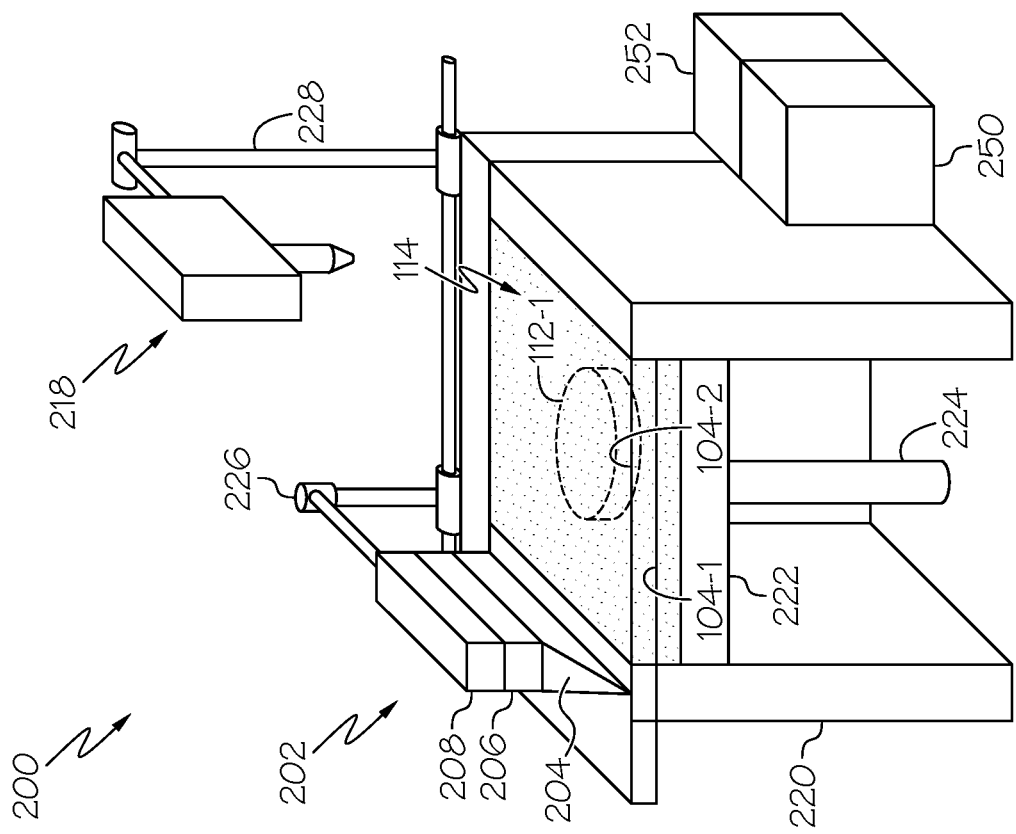
FIG. 5 is a schematic illustration of an example of the additive manufacturing system, in which an object is fully formed.

This forming-and-joining procedure is repeated a number of times to produce a number of powder layers 104-N, to produce a number of object layers 112-N, and, ultimately, to produce the object 100 (FIG. 5). Each successive one of the plurality of powder layers 104 is formed on the previously formed and underlying one of the plurality of powder layers 104 and one of the plurality of object layers 112. Each successive one of the plurality of object layers 112 is formed on and is attached to the previously formed and underlying one of the plurality of object layers 112 to add a new object layer to the object 100.

The powder 102 includes any powder material that is suitable to be joined layer-by-layer to make the object 100. Examples of the powder 102 include, but are not limited to, metallic powder, metallic alloy powder, ceramic powder, polymeric powder, and the like.

Figure 6:
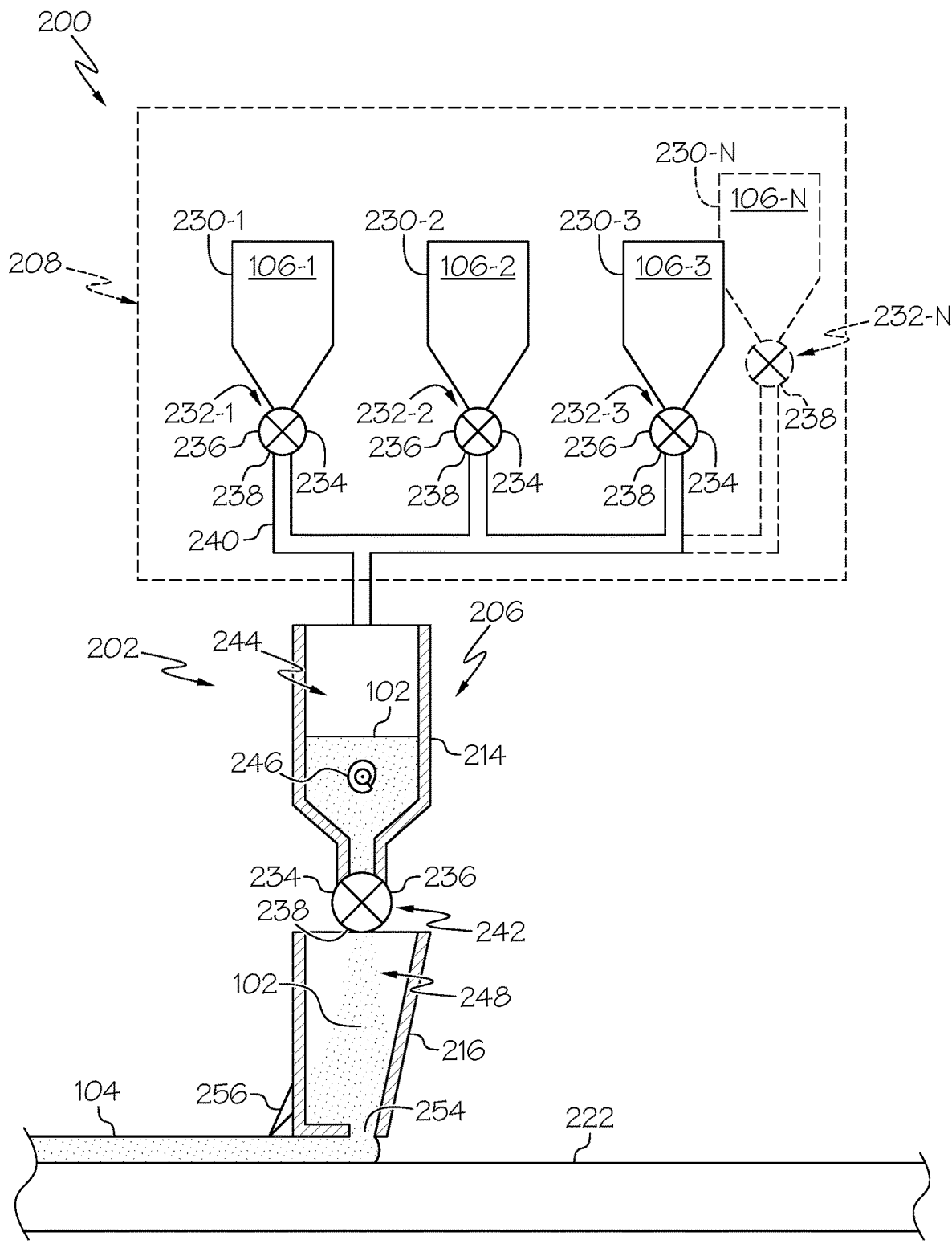
FIG. 6 is a schematic illustration of an example of a powder-deposition apparatus of the additive manufacturing system.
Figure 7:
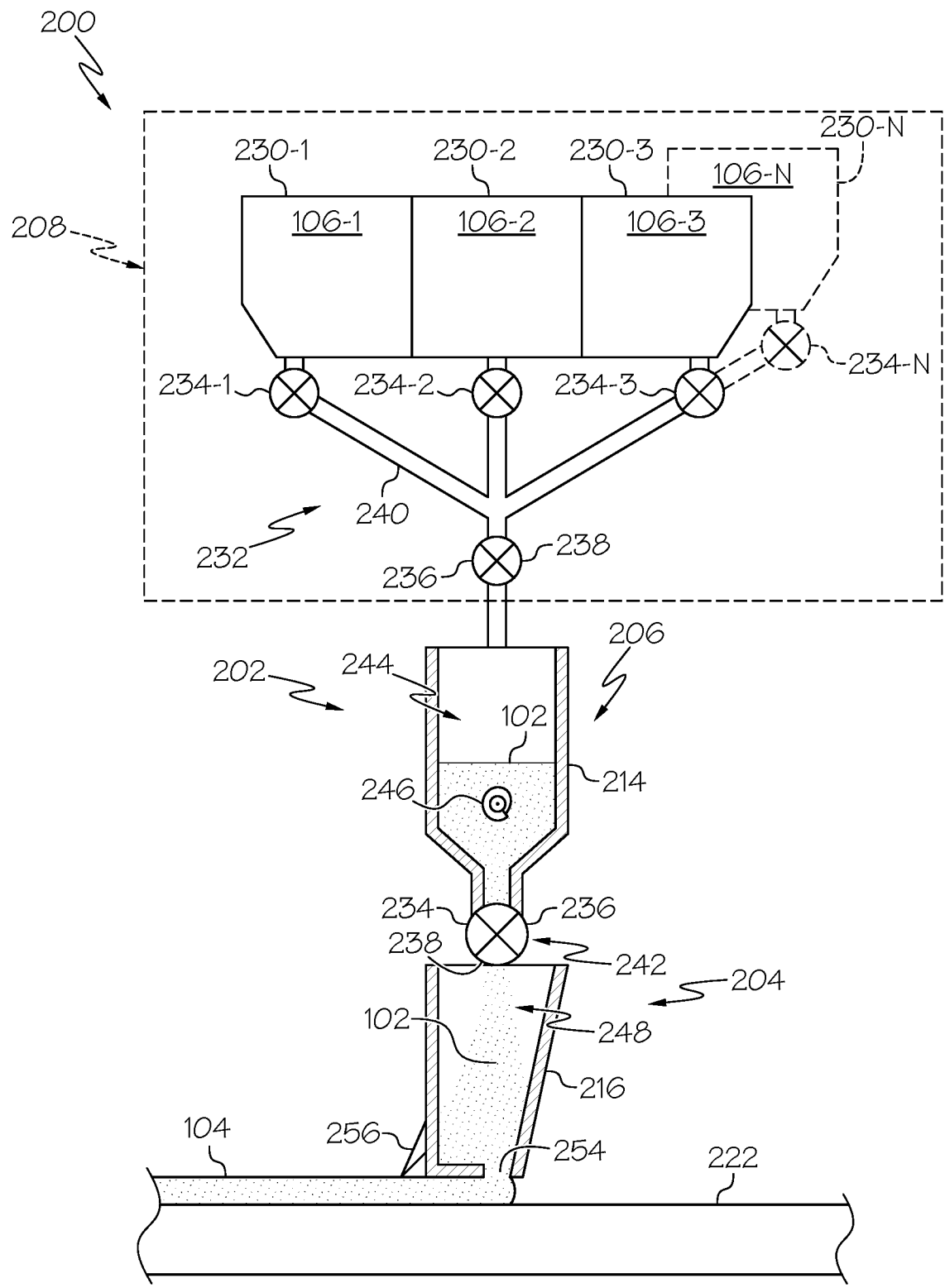
FIG. 7 is a schematic illustration of an example of the powder-deposition apparatus of the additive manufacturing system.

The composition of the powder 102 includes a number of (e.g., one or more) powder constituents 106 (FIGS. 6 and 7). Throughout the present disclosure, the number of powder constituents 106 may be referred to individually as powder constituent 106-1 through powder constituent 106-N. The composition of the powder 102 forming each one of the plurality or powder layers 104, or any portion of each one of the plurality of powder layers 104, is selected based on various factors, such as, but not limited to, desired material composition of the object 100, desired structural properties of the object 100, desired functional properties of the object 100, the type of joining process used to join the powder 102 to make the object 100, and the like.

Referring to FIGS. 6 and 7, in one or more examples, the powder 102 includes a plurality of powder constituents 106, such as, a first powder constituent 106-1, a second powder constituent 106-2, and a third powder constituent 106-3. In other examples, the powder 102 includes any number of powder constituents 106-N, such as the first powder constituent 106-1, the second powder constituent 106-2, and any number of additional powder constituents 106 (e.g., a third powder constituent, a fourth powder constituent, etc.).

As will be described herein, the powder-deposition apparatus 202 is configured to selectively control the composition of the powder 102 that is deposited in the powder bed 114. In one or more examples, the powder-deposition apparatus 202 is configured to selectively control the composition of the powder 102 forming each one of the plurality of powder layers 104. In one or more examples, the powder-deposition apparatus 202 is configured to selectively control the composition of the powder 102 forming discrete sections of each one of the plurality of powder layers 104.

According to the method 1000 (FIG. 10), in one or more examples, the step of (block 1006) selectively controlling the composition of the powder 102 includes a step of selectively varying the composition of the powder 102 to achieve a powder gradient within one or more of the plurality of powder layers 104. In one or more examples, the additive manufacturing system 200 is configured to deposit the powder 102 to produce the powder gradient within one or more of the plurality of powder layers 104.

The powder gradient represents a transition between different compositional ratios of the plurality of powder constituents 106 used to produce the powder 102 that forms each one of the powder layers 104. In one or more examples, the powder gradient is formed within each one of the powder layers 104. In one or more examples, the powder gradient is formed through the plurality of powder layers 104.

In an example of the powder gradient, a first portion of a given one of the powder layers 104 includes the powder 102 having a first composition, formed by at least one of the powder constituents 106. A second portion of the given one of the powder layers 104 includes powder 102 having a second composition, formed by at least one of the powder constituents 106. A third portion of the given one of the powder layers 104 includes powder 102 having a third composition, formed by at least one of the powder constituents 106. The first composition, the second composition, and the third composition of the powder 102 are different, such as by varying the compositional ratios, or weight percentages, of the plurality of powder constituents 106. The second composition is a gradient portion of the given one of the powder layers 104, forming a compositional gradient zone that transitions between the first composition and the second composition in one axial direction.

Distribution of the powder constituents 106 and the number of different compositions of the powder 102 forming any one of the powder layers 104 is not limited to the examples disclosed herein. In other examples, the powder gradient may have any other compositional distribution in one or more axial directions. Accordingly, a given one of the object layers 112, formed by joining the powder 102 of the given one of the powder layers 104 having the powder gradient, includes a compositional gradient in one or more axial directions that corresponds to the powder gradient.

In one or more examples, the powder gradient of each one of the plurality of powder layers 104 is the same, such that the composition of the object 100 is substantially the same through its thickness. In these examples, the object 100 may have a compositional gradient along the X-axis and/or the Y-axis.

In one or more examples, the powder gradient of one or more of the plurality of powder layers 104 is different, such that the composition of the object 100 varies through its thickness. In these examples, the object 100 may have a compositional gradient along the X-axis and/or the Y-axis and the Z-axis.

In one or more examples, the powder 102 of each one of the powder layers 104 is composed of only one of the powder constituents 106, however, the powder constituent 106 varies among the successive ones of the powder layers 104. In these examples, the object 100 may have a compositional gradient along the Z-axis.

Referring to FIG. 1, in one or more examples, the method 1000 includes a step of (block 1018) producing the powder 102 that is used to form each one of the plurality of powder layers 104. In one or more examples, the method 1000 includes a step of (block 1014) mixing a plurality of powder constituents 106 together to produce the powder 102 that is deposited to form each one of the plurality of powder layers 104. In one or more examples, the step of (block 1006) selectively controlling the composition of the powder 102 includes a step of (block 1016) selectively controlling a compositional ratio of each one of the plurality of powder constituents 106 being mixed to produce the powder 102.

In one or more examples, the step of (block 1016) selectively controlling the compositional ratio of the plurality of powder constituents 106 includes a step of selectively controlling a mass of each one of powder constituents 106 being mixed to produce the powder 102. In one or more examples, the step of selectively controlling the mass of each one of powder constituents 106 includes a step of monitoring, modifying, and/or verifying the mass of each one of the powder constituents 106 being dispensed, such as by measuring the mass of each one of powder constituents 106, through real-time computational iterations and adjustments in the analytical model and equations within the controller 250. In one or more examples, the step of selectively controlling the mass of each one of powder constituents 106 also includes a step of selectively dispensing a predetermined mass of each one of the powder constituents 106, such as by modifying the mass of at least one of the powder constituents 106 being dispensed based on the measured mass.

Selectively dispensing the predetermined mass of each one of the powder constituents 106 provides the powder 102 having the predetermined (e.g., desired) composition. Monitoring the mass of each one of the powder constituents 106 being dispensed serves as quality control measure that ensures the actual composition of the powder 102 (e.g., the actual compositional ratio of the plurality of powder constituents 106) is equal to or is within an allowable tolerance of the desired (e.g., predetermined) composition of the powder 102 (e.g., compositional ratio of the plurality of powder constituents 106).

Referring to FIGS. 6 and 7, in one or more examples, the powder-deposition apparatus 202 includes a powder feeder 208, a mixer 206, and a recoater 204. The powder feeder 208 is configured to selectively dispense each one of powder constituents 106 to the mixer 206 such that the composition of the powder 102 is selectively controlled. In one or more examples, the composition of the powder 102 is selectively controlled by selectively controlling the mass (e.g., a quantity or amount) of each one of the powder constituents 106 that is selectively dispensed from the powder feeder 208 to the mixer 206.

The mixer 206 is in volumetric communication with the powder feeder 208 such that each one of powder constituents 106 is transferred to the mixer 206. In one or more examples, the mixer 206 is coupled to the powder feeder 208 via the feed line 240, such as a conduit, a tube, and the like. The mixer 206 is configured to mix the plurality of powder constituents 106, selectively dispensed from the powder feeder 208, together to produce the powder 102 having a predetermined (e.g., desired) composition. The mixer 206 is also configured to dispense the powder 102 to the recoater 204. The recoater 204 is in volumetric communication with the mixer 206 such that the powder 102, produced in the mixer 206, is transferred to the recoater 204. The recoater 204 is configured to discharge the powder 102 such that each successive one of the plurality of powder layers 104 is formed.

The mixer 206 includes any structure and mechanism suitable to hold and mix a powder material. In one or more examples, the mixer 206 includes a mixing chamber 214 that forms a mixer reservoir 244, configured to hold the powder constituents 106 during mixing. The mixer 206 includes a mixing device 246, such as an auger, that is configured to mix or blend the powder constituents 106 to produce the powder 102.

The recoater 204 includes any structure and mechanism suitable to hold and discharge a powder material to form a layer of the powder material. In one or more examples, the recoater 204 includes a discharge chamber 216 that forms a discharge reservoir 248, configured to hold the powder 102 received from the mixer 206. The recoater 204 includes a discharge opening 254 for discharging the powder 102 from the discharge reservoir 248. The recoater 204 may also include a leveling device 256, such as a roller or a blade, that is configured to level out the powder 102 that has been discharged from the discharge opening 254 and deposited in the powder bed 114.

In one or more examples, at least one of the powder feeder 208, the mixer 206 and the recoater 204 is gravity fed, such that an associated powder material is dispensed by force of gravity. In one or more examples, at least one of the powder feeder 208, the mixer 206 and the recoater 204 is drive fed such that an associated powder material is dispensed by force of a propellant or by force of an actuator.

In one or more examples, the powder feeder 208 includes a plurality of constituent reservoirs 230. Throughout the present disclosure, the plurality of constituent reservoirs 230 may be referred to individually as constituent reservoir 230-1 through constituent reservoir 230-N. Each one of the constituent reservoirs 230 is configured to hold an associated one of the powder constituents 106 and to selectively dispense the associated one of the powder constituents 106 to the mixer 206. In one or more examples, the mixer 206 is coupled to each one of the constituent reservoirs 230 via the feed line 240, such that each one of the powder constituents 106 is transferred from a respective one of the constituent reservoirs 230 to the mixer 206.

In one or more examples, the constituent reservoirs 230 take the form any suitable powder material hopper having a structure that is configured to store and dispense a powder material. As illustrated in FIG. 6, in one or more examples, the plurality of constituent reservoirs 230 includes a plurality of independent and separate hopper structures. As illustrated in FIG. 7, in one or more examples, the plurality of constituent reservoirs 230 includes a single hopper structure that includes a plurality of constituent chambers, each configured to store one of the powder constituents 106. In any of these examples, the powder feeder 208 is configured to contain the plurality of powder constituents 106 such that each one of the plurality of powder constituents 106 is segregated from the other ones of the plurality of powder constituents 106 within the plurality of constituent reservoirs 230.

In one or more examples, the powder feeder 208 also includes a plurality of constituent regulators 232. Throughout the present disclosure, the plurality of constituent regulators 232 may be referred to individually as constituent regulator 232-1 through constituent regulator 232-N. Each one of the plurality of constituent regulators 232 is associated with a respective one of the plurality of constituent reservoirs 230. Each one of plurality of constituent regulators 232 is configured to selectively dispense a respective one of the plurality of powder constituents 106 from an associated one of the constituent reservoirs 230 to the mixer 206, for example, via the feed line 240.

Each one of the plurality of constituent regulators 232 includes any type of regulator suitable for selectively controlling a flow of a powder material dispensed from a powder hopper. In one or more examples, each one of the plurality of constituent regulators 232 is configured to selectively control a mass (e.g., an amount or quantity) of a respective one of the plurality of powder constituents 106 dispensed from an associated one of the plurality of constituent reservoirs 230. As such, the plurality of constituent regulators 232 is capable of suppling the mixer 206 with predetermined masses of the plurality of powder constituents 106 based on system requirements.

In one or more examples, each one of the constituent regulators 232 includes a valve 234. The valve 234 of each one of the constituent regulators 232 is configured to regulate the flow of a respective one of the powder constituents 106 from an associated one of the constituent reservoirs 230. The valve 234 of each one of the constituent regulators 232 is configured to be selectively open, selectively closed, or selectively partially open. In one or more examples, the valve 234 of each one of the constituent regulators 232 is a butterfly valve.

In one or more examples, each one of the constituent regulators 232 includes a mass sensor 236. The mass sensor 236 of each one of the constituent regulators 232 is configured to measure the mass of a respective one of the powder constituents 106 passing through an associated one of the constituent regulators 232. In one or more examples, the mass sensor 236 of each one of the constituent regulators 232 provides in-line measurements such that the mass of a respective one of the powder constituents 106 passing through the valve 234 of an associated one of the constituent regulators 232 can be accurately measured.

In one or more examples, the desired (e.g., predetermined) mass of each one of the plurality of powder constituents 106 to be dispensed from an associated one of the plurality of constituent regulators 232 is based on a number of known parameters and values, such as, but not limited to: a selected area to be covered by the powder 102 to form each one of the powder layers 104, or a section of each one of the powder layers 104, and a layer thickness of each one of the powder layers 104, (e.g., a volume of the powder 102 needed to form the powder layer 104); an average particle size of each one of the powder constituents 106; and an average particle density of each one of the powder constituents 106.

From the known parameters and values, the mass of each one of the powder constituents 106 needed to produce a sufficient amount of the powder 102 to form each one of the powder layers 104, or a section of each one of the powder layers 104, can be determined. During delivery of each one of the powder constituents 106 from an associated one of the constituent regulators 232 to the mixer 206, the controller 250 monitors the mass, as measured by the mass sensor 236. Once the predetermined mass each one of the powder constituents 106 is dispensed from an associated one of the constituent reservoirs 230, as measured by the mass sensor 236 of a respective one of the constituent regulators 232, the valve 234 of each one of the constituent regulators 232 is selectively closed, under direction from the controller 250.

In one or more examples, the mass of each one of the powder constituents 106 passing through an associated one of the constituent regulators 232 can be adjusted as required.

According to the method 1000 (FIG. 1), in one or more examples, the step of (block 1016) selectively controlling the compositional ratio of the plurality of powder constituents 106 includes a step of selectively controlling a mass flow rate of each one of powder constituents 106 being mixed to produce the powder 102. In one or more examples, the step of selectively controlling the mass flow rate of each one of powder constituents 106 includes a step of monitoring the mass flow rate of each one of the powder constituents 106 being dispensed, such as by measuring the mass flow rate of each one of powder constituents 106. In one or more examples, the step of selectively controlling the mass flow rate of each one of powder constituents 106 also includes a step of selectively dispensing each one of the powder constituents 106 at a predetermined mass flow rate of each one of the powder constituents 106, such as by monitoring, modifying, and/or verifying the mass flow rate of at least one of the powder constituents 106 being dispensed based on the measured mass flow rate, through real-time computational iterations and adjustments in the analytical model and equations within the controller.

Selectively dispensing each one of the powder constituents 106 at the predetermined mass flow rate provides the powder 102 having the predetermined (e.g., desired) composition. Monitoring the mass flow rate of each one of the powder constituents 106 serves as another quality control measure that ensures the actual composition of the powder 102 (e.g., the actual compositional ratio of the plurality of powder constituents 106) is equal to or is within an allowable tolerance of the desired (e.g., predetermined) composition of the powder 102 (e.g., compositional ratio of the plurality of powder constituents 106).

As illustrated in FIGS. 6 and 7, in one or more examples, each one of the constituent regulators 232 includes a mass flow sensor 238. The mass flow sensor 238 of each one of the constituent regulators 232 is configured to measure the mass flow rate of a respective one of the powder constituents 106 passing through an associated one of the constituent regulators 232. In one or more examples, the mass flow sensor 238 of each one of the constituent regulators 232 provides in-line measurements such that the mass flow rate of each one of the powder constituent 106 passing through the valve 234 of an associated one of the constituent regulators 232 can be accurately measured.

The mass flow rate of each one of the powder constituents 106 delivered through an associated one of the constituent regulators 232 and, thus, dispensed from an associated one of the constituent reservoirs 230 is determined based on a number of known parameters and values. In one or more examples, the mass flow rate of each one of the powder constituents 106 to be dispensed is based on the mass of each one of the powder constituents 106 making up the powder 102, a volume of each one of the powder constituents 106 needed to form one of the powder layers 104, a density each one of the powder constituents 106 making up the powder 102, an outlet size of the valve 234 of an associated one of the constituent regulators 232, and a time duration.

In one or more examples, the desired (e.g., predetermined) mass flow rate of each one of the powder constituents 106 to be dispensed from an associated one of the plurality of constituent regulators 232 is based on a number of known parameters and values, such as, but not limited to: the mass of each one of the powder constituents 106 needed for the desired composition of the powder 102; the selected area to be covered by the powder 102 to form each one of the powder layers 104, or a section of each one of the powder layers 104, and the layer thickness of each one of the powder layers 104; the average particle size of each one of the powder constituents 106; the average particle density of each one of the powder constituents 106; a volume of an exit orifice of the valve 234 of each one of the constituent regulators 232; and a time required to dispense the predetermined mass of each one of the powder constituents 106 needed to form each one of the powder layers 104.

From the known parameters and values, the mass flow rate of each one of the powder constituents 106 needed to produce the desired composition of the powder 102 to form each one of the powder layers 104, or a selected portion of each one of the powder layers 104, can be determined. During delivery of each one of the powder constituents 106 from an associated one of the constituent regulators 232 to the mixer 206, the controller 250 monitors the mass flow rate, as measured by the mass flow sensor 238. When the measured mass flow rate of any one of the powder constituents 106 deviates from the predetermined mass flow rate, the valve 234 of an associated one of the constituent regulators 232 is selectively partially opened or selectively partially closed, under direction from the controller 250, to adjust the volume of the exit orifice of the valve 234, such that the measured mass flow rate of each one of the powder constituents 106 and the predetermined mass flow rate of each one of the powder constituents 106 are equal or are within an allowable tolerance.

In one or more examples, the mass and/or the mass flow rate of each one of the powder constituents 106 can be adjusted as required. In one or more examples, control of masses and/or the mass flow rates of the powder constituents 106 is performed manually. In one or more examples, control of the masses and/or the mass flow rates of the powder constituents 106 is performed automatically, such as via control signals received from the controller 250 (FIGS. 2-5). In one or more examples, each one of the constituent regulators 232 is actively controlled, for example, manually or under direction from the controller 250, to selectively dispense the predetermined mass of a respective one of the plurality of powder constituents 106 at the predetermined mass flow rate, according to a predetermined plan stored in the controller 250.

As illustrated in FIG. 6, in one or more examples, the valve 234, the mass sensor 236, and the mass flow sensor 238 are incorporated into each one of the constituent regulators 232 that is associated with a corresponding one of the constituent reservoirs 230. These examples enable each of the powder constituents 106 to be selectively dispensed to the mixer 206 concurrently, which may advantageously reduce cycle time and improve process efficiency. In other examples, the components of one or more of the constituent regulators 232 may be distributed in various configurations. As illustrated in FIG. 7, in one or more examples, one or more of the constituent reservoirs 230 may share one or more components of the constituent regulator 232. For example, each one of the constituent reservoirs 230 has an associated valve 234 (e.g., 234-1 through 234-N), but the constituent reservoirs 230 share a common mass sensor 236 and mass flow sensor 238.

According to the method 1000 (FIG. 1), in one or more examples, the step of (block 1006) selectively controlling the composition of the powder 102 also includes a step of monitoring the mass of the powder 102, produced by mixing the predetermined and selectively controlled compositional ratio of the plurality of powder constituents 106. Monitoring the mass of the powder 102, formed by the plurality of powder constituents 106, serves as a quality control measure that verifies whether the actual composition of the powder 102 being dispensed to the recoater 204 is equal to or is within an allowable tolerance of the desired (e.g., predetermined) composition of the powder 102.

As illustrated in FIGS. 6 and 7, in one or more examples, the powder-deposition apparatus 202 includes a dispensing regulator 242. The dispensing regulator 242 is configured to selectively dispense the powder 102 from the mixer 206 to the recoater 204.

In one or more examples, the dispensing regulator 242 includes the valve 234. The valve 234 of the dispensing regulator 242 is configured to regulate the flow of the powder 102 from the mixer 206. The valve 234 of the dispensing regulator 242 is configured to be selectively open, selectively closed, or selectively partially open. In one or more examples, the valve 234 of the dispensing regulator 242 is a butterfly valve.

In one or more examples, the dispensing regulator 242 includes the mass sensor 236. The mass sensor 236 of the dispensing regulator 242 is configured to measure the mass of the powder 102 passing through the dispensing regulator 242. In one or more examples, the mass sensor 236 of the dispensing regulator 242 provides in-line measurements such that the mass of the powder 102 passing through the valve 234 of the dispensing regulator 242 can be accurately measured.

In one or more examples, the mass of the powder 102, formed by the plurality of powder constituents 106, as measured by the mass sensor 236 of the dispensing regulator 242, is provided to the controller 250 (FIGS. 2-5), which monitors the mass of the powder 102 being dispensed from the mixer 206. When the measured mass of the powder 102, having the actual composition, deviates from the desired (e.g., predetermined) mass of the powder 102, having the predetermined composition, a selected one of the constituent regulators 232 selectively dispenses, under direction from the controller 250, an additional mass of one of the powder constituents 106 to adjust the composition of the powder 102, such that measured mass of the powder 102 and the desired mass of the powder 102 are equal or are within an allowable tolerance.

According to the method 1000 (FIG. 1), in one or more examples, the step of (block 1016) selectively controlling the compositional ratio of the plurality of powder constituents 106 includes a step of selectively controlling a mass flow rate of the powder 102 being dispensed from the mixer 206 to the recoater 204. In one or more examples, the step of selectively controlling the mass flow rate of powder 102 includes a step of monitoring the mass flow rate of the powder 102, such as by measuring the mass flow rate of the powder 102. In one or more examples, the step of selectively controlling the mass flow rate of powder 102 also includes a step of selectively dispensing the powder 102 at a predetermined mass flow rate, such as by modifying the mass flow rate of the powder 102 based on the measured mass flow rate. Selectively dispensing the powder 102 at the predetermined mass flow rate provides each one of the powder layers 104 having the predetermined (e.g., desired) composition. Monitoring the mass flow rate serves as a quality control measure that ensures the actual composition of the powder 102 forming each one of the powder layers 104 is equal to or is within an allowable tolerance of the desired (e.g., predetermined) composition.

Referring to FIGS. 6 and 7, in one or more examples, the dispensing regulator 242 includes the mass flow sensor 238. The mass flow sensor 238 of the dispensing regulator 242 is configured to measure the mass flow rate of the powder 102 passing through the dispensing regulator 242 and being dispensed to the recoater 204. In one or more examples, the mass flow sensor 238 of the dispensing regulator 242 provides in-line measurements such that the mass flow rate of the powder 102 passing through the valve 234 of the dispensing regulator 242 can be accurately measured.

In one or more examples, the desired (e.g., predetermined) mass flow rate of the powder 102 dispensed from the mixer 206 and, thus, the desired (e.g., predetermined) mass of the powder 102 discharged from the recoater 204 is based on a number of known parameters and values, such as, but not limited to: a selected area to be covered by the powder 102 to form each one of the powder layers 104, or a section of each one of the powder layers 104, and a layer thickness of each one of the powder layers 104 (e.g., the volume of the powder 102 needed to form each one of the powder layers 104 or a section of each one of the powder layers 104); an average particle size of the powder 102, an average particle density of the powder 102, a volume of an exit orifice of the valve 234 of the dispensing regulator 242, and a time required to dispense the predetermined mass of the powder 102 needed to form each one of the powder layers 104.

From the known parameters and values, the mass flow rate of the powder 102 needed to form each one of the powder layers 104, or a selected portion of each one of the powder layers 104, can be determined. During discharge of the powder 102 from the mixer 206, the controller 250 monitors the mass flow rate of the powder 102, as measured by the mass flow sensor 238.

In one or more examples, when a measured mass flow rate of the powder 102 deviates from the predetermined mass flow rate of the powder 102, the valve 234 of the dispensing regulator 242 is selectively partially opened or selectively partially closed under direction from the controller 250 to adjust the volume of the exit orifice of the valve 234 of the dispensing regulator 242, such that the measured mass flow rate of the powder 102 and the predetermined mass flow rate of the powder 102 are equal or are within an allowable tolerance.

In one or more examples, when a measured mass flow rate of the powder 102, having the actual composition, deviates from the predetermined mass flow rate of the powder 102, having the predetermined composition, a selected one of the constituent regulators 232, under direction from the controller 250, selectively dispense an additional mass of one of the powder constituents 106 to the mixer 206 to adjust the composition of the powder 102, such that the measured mass flow rate of the powder 102 and the predetermined mass flow rate of the powder 102 are equal or are within an allowable tolerance.

Accordingly, measuring the mass and the mass flow rate of the powder 102 being dispensed from the mixer 206 to the recoater 204 enables control over the amount of powder 102 being dispensed and provides information that enables selective control of the composition of the powder 102.

In one or more examples, the mass and the mass flow rate of the powder 102 can be adjusted as required. In one or more examples, control of the dispensing regulator 242 is performed manually. In one or more examples, control of the dispensing regulator 242 is performed automatically, such as via control signals received from a controller 250 (FIGS. 2-5). In one or more examples, a predetermined mass of the powder 102 is selectively dispensed, under direction from the controller 250, at predetermined mass flow rate according to a predetermined plan stored in the controller 250.

In one or more examples, the valve 234 of each one of the constituent regulators 232 and the dispensing regulator 242 is an electronic valve that is in communication with and controlled by the controller 250. In one or more examples, the mass sensor 236 of each one of the constituent regulators 232 and of the dispensing regulator 242 is in communication with the controller 250. In one or more examples, the mass flow sensor 238 of each one of the constituent regulators 232 and of the dispensing regulator 242 is in communication with the controller 250.

Referring to FIG. 1, in one or more examples, the step of (block 1006) selectively controlling the composition of the powder 102 precedes the step of (block 1002) selectively depositing the powder 102. For example, the powder feeder 208 is configured to selectively control the composition of the powder 102, under direction from the controller 250, being dispensed to the mixer 206. The powder 102, having the selected controlled composition, is then dispensed to the recoated 204 before the powder 102 is discharged from the recoater 204. As such, the composition of the powder 102 can be controlled before the recoater 204 moves relative to (e.g., across) the build platform 222 to deposit the powder 102 and to form each one of the powder layers 104.

In one or more examples, the step of (block 1006) selectively controlling the composition of the powder 102 and the step of (block 1002) selectively depositing the powder 102 occur concurrently. For example, the powder feeder 208 is configured to selectively control the composition of the powder 102, under direction from the controller 250, being dispensed to the recoater 204, via the mixer 206, while the powder 102 is being discharged from the recoater 204. As such, the composition of the powder 102 can be controlled in real-time as the recoater 204 moves relative to (e.g., across) the build platform 222 to deposit the powder 102 and to form each one of the powder layers 104. This real-time control of the composition of the powder 102 may increase process efficiency and reduce cycle time.

As expressed above, in one or more examples, powder-deposition apparatus 202 is configured to selectively control the mass of each one of the powder constituents 106 that is delivered to the mixer 206 and mixed to produce the powder 102. Additionally, the powder-deposition apparatus 202 is configured to selectively control the mass of the powder 102, formed by the mixture of powder constituents 106, that is delivered from the mixer 206 to the recoater 204 to form each one of the powder layers 104. Accordingly, the combination of measuring and selectively controlling the mass and the mass flow rate provides real-time control over the composition of the powder 102 and deposition of the powder 102 to form each one of the powder layers 104.

In one or more example implementations of the additive manufacturing system 200 and the method 1000, a desired layer thickness of each one of the powder layers 104 and the percent composition of each one of the powder constituents 106 is provided as inputs to the controller 250. For a given powder gradient within each one of the powder layers 104 or through a plurality of the powders layers 104, the percent composition of each one of the powder constituents 106 at a start point of a powder deposition operation and the percent composition of each one of the powder constituents 106 at an end point of the powder deposition operation are provided as inputs to the controller 250. The controller 250 is configured to mathematically iterate for a plurality of points between the start point and the end point to provide the percent composition of each one of the powder constituents 106 used to form the powder 102 through the powder deposition operation when forming each one of the powder layers 104.

In one or more examples, the mass of the each one of the powder constituents 106 is known values per its unique material density. In one or more examples, the material densities of the various powder constituents 106 are stored in a material lookup table that is accessible by the controller 250. The mass of the powder 102 is measured prior to deposition to determine an average density of the resultant mixture of the powder constituents 106. Based on the measured mass of the powder 102, the actual composition of the powder 102 can be adjusted electronically in real-time to reach the desired (e.g., predetermined) composition. The mass per unit volume of each one of the powder constituents 106 is a known value based on average particle size and an exit volume at a discharge point (e.g., at the valve 234) is also a known value. The mass flow rate of the powder 102 is measured during deposition to the recoater 204. A feedback loop is used by the controller 250 to iterate on the process parameters when the measured mass flow rate of the powder 102 does not correlate 1:1 with the average particle density such that the controller 250 automatically adjusts the masses of the powder constituents 106 to achieve the desired composition of the powder 102.

As such, the controller 250 utilizes machine learning or artificial intelligence to actively control the composition of the powder 102 as the powder 102 is being dispensed from the mixer 206 to the recoater 204 to form each one of the powder layers 104. Such active control also serves as quality control. Through use of the controller 250, an automated and iterative process is performed, for example, using the lookup tables, to determine both optimized build parameters and material compositions at any moment in time and/or at any point in the build of each one of the object layers 112.

In one or more examples, the controller 250 is a feedback controller that uses sensor data, for example, from the various mass sensors and mass flow sensors, and a feedback control algorithm to generate a number of commands to control the composition and the dispense rate of the powder 102. For example, verification of the mass through real-time computational iterations and adjustments in the analytical model and equations, executed by the controller 250, serve as continuous quality control checks of the intended composition of the powder 102.

Combinations of varying parameters create an iterative multivariable feedback algorithm utilized by the controller 250. By way of example, the controller 250 may employ one or more of the following relationships during execution of the feedback control algorithm.

$$M_{fp} = (\rho_p * V_e)/t$$

$M_{fp}$ is the mass flow rate of the particles of the powder at an exit orifice.

$\rho_p$ is the average density of the particles of the powder.

$V_e$ is the volume at an exit, or discharge, orifice for the powder.

t is time.

In an example, the mass flow rate of the powder 102 corresponds to the mass flow rate of the particles of the powder 102 at the exit (e.g., discharge) orifice of the valve 234 of the dispensing regulator 242. In another example, the mass flow rate of any one of the powder constituents 106 corresponds to the mass flow rate of the particles of the corresponding one of the powder constituents 106 at the exit (e.g., discharge) orifice of the valve 234 of the associated constituent regulator 232.

In one or more examples, the average density of the particles (pp) is determined based on the percent composition of each one of the powder constituents 106 forming the powder 102.

$$\rho_p = (\% \ Wt_{m1} * \rho_{m1}) + [1 - (\% \ Wt_{m1}) * \rho_{m2}]$$

$\% \ Wt_{m1}$ is the weight percentage of a first one of the powder constituents 106 forming the powder (e.g., the first powder constituent 106-1).

$\rho_{m1}$ is the average density of the particles of the first one of the powder constituents 106 forming the powder 102 (e.g., the first powder constituent 106-1).

$\rho_{m2}$ is the average density of the particles of a second one of the powder constituents 106 forming the powder 102 (e.g., the second powder constituent 106-2).

The above examples depict the powder 102 formed by a mixture of two powder constituents 106 (e.g., the first powder constituent 106-1 and the second powder constituent 106-2) and, as such, the powder gradient formed within each one of the powder layers 104 includes a gradient zone that varies the percent composition of two powder constituents 106. In other examples, the powder 102 is formed by any number of powder constituents 106-N and, as such, the powder gradient includes a gradient zone that varies the percent composition of two or more powder constituents 106.

As such, the average density of the particles (pp) used by the feedback control algorithm is scalable to account for the number of powder constituents 106-N.

As such, for three powder constituents 106, the average density is calculated by:

$$\rho_p = (\% \ Wt_{m1} * \rho_{m1}) + [1-(\% \ Wt_{m1} + \% \ Wt_{m3})*\rho_{m2}] + [1-(\% \ Wt_{m1} + \% \ Wt_{m2})*\rho_{m3}]$$

% $Wt_{m3}$ is the weight percentage of a third one of the powder constituents 106 forming the powder 102 (e.g., the third powder constituent 106-3).

$\rho_{m3}$ is the average density of the particles of the third one of the powder constituents 106 forming the powder 102 (e.g., the third powder constituent 106-3).

This same scaling procedure can be applied for any number of powder constituents 106-N that is required or desired for any composition of the powder 102.

According to the method 1000 (FIG. 1), in one or more examples, the step of (block 1006) selectively controlling the composition of the powder 102, that forms each one of the plurality of powder layers 104, includes a step of varying, or adjusting, the compositional ratio of the plurality of powder constituents 106 being mixed to produce the powder 102 that forms each successive one of the plurality of powder layers 104. In other words, the composition of the powder 102 is the same within an entirety of each one of the powder layers 104 (e.g., along the X-axis and the Y-axis) and the composition of the powder 102 varies between different ones of the powder layers 104 (e.g., along the Z-axis). In these examples, each one of the plurality of powder layers 104 has a constant composition and the composition of at least one of the powder layers 104 is different than the composition of at least another one of the powder layers 104, which results in a powder gradient along the Z-axis. Accordingly, each one of the plurality of object layers 112 has a constant composition and the composition of at least one of the object layers 112 is different than the composition of at least another one of the object layers 112, which results in a compositional gradient of the object 100 (FIG. 5) along the Z-axis.

In one or more examples, the actual mass of the powder 102 that is produced is equal to the predetermined mass of the powder 102 that is required to form an entirety of an associated one of the plurality of powder layers 104. The compositional ratio of select ones of the plurality of powder constituents 106 is monitored and selectively controlled such that the composition of the powder 102 corresponds to a desired (e.g., predetermined) composition of the associated one of the powder layers 104.

Figure 8:
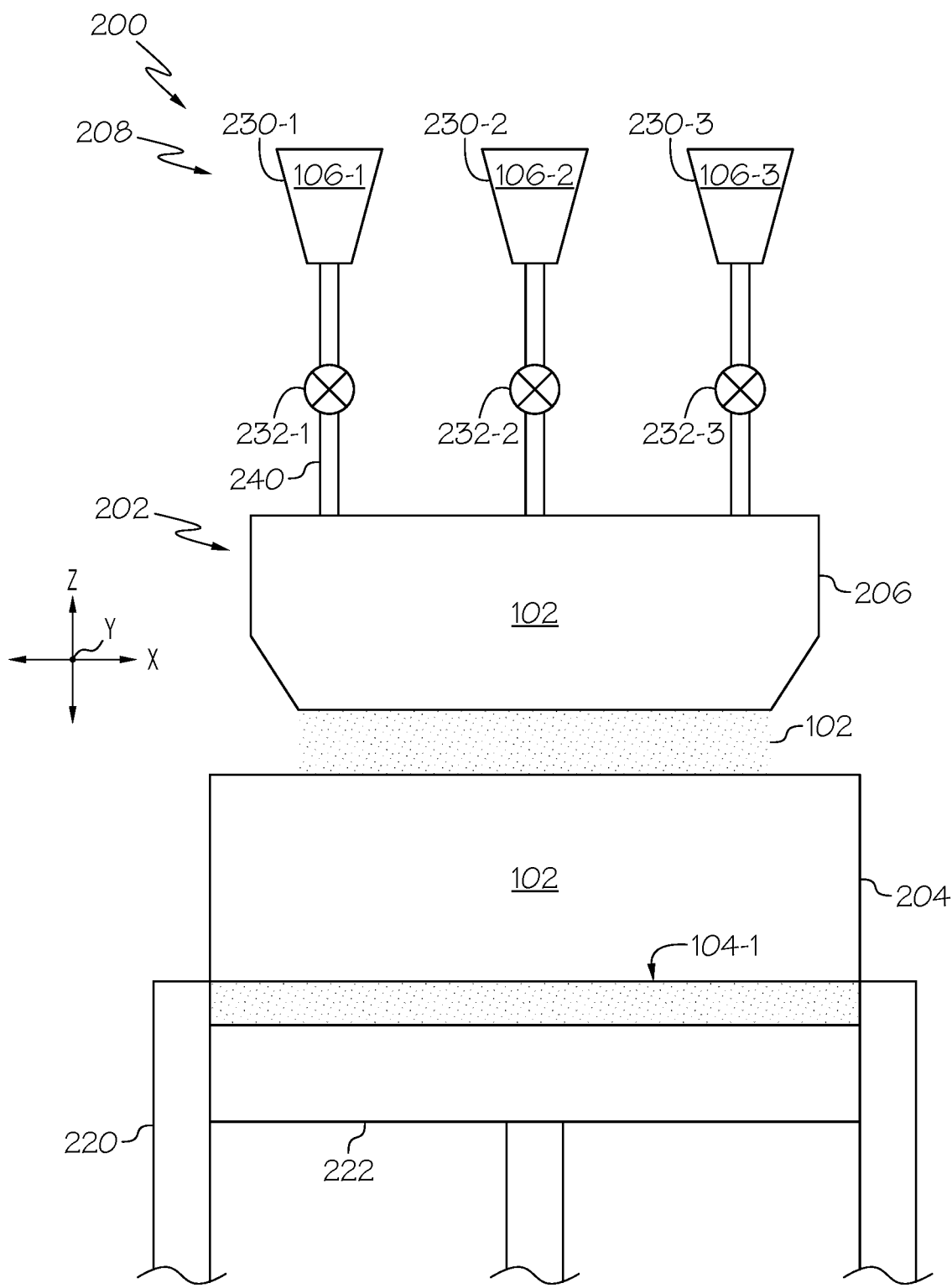
FIG. 8 is a schematic illustration of an example of the powder-deposition apparatus forming the first powder layer.
Figure 9:
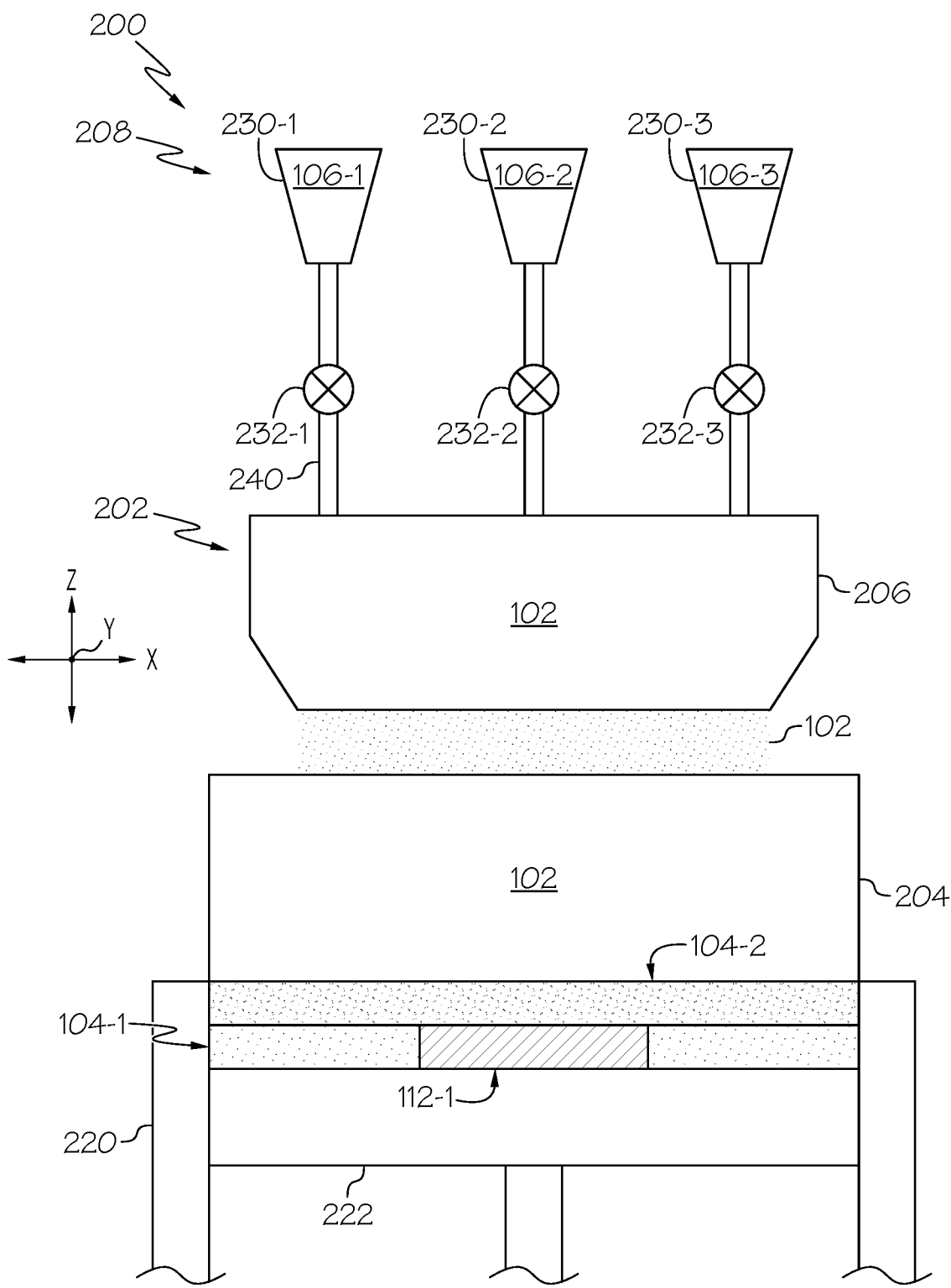
FIG. 9 is a schematic illustration of an example of the powder-deposition apparatus forming the second powder layer.

FIG. 8 schematically illustrates an example of the first powder layer 104-1 being formed on the build platform 222 using an example of the powder-deposition apparatus 202. FIG. 9 schematically illustrates an example of the second powder layer 104-2 being formed on the first powder layer 104-1 and the first object layer 112-2. In the examples illustrated in FIGS. 8 and 9, the powder-deposition apparatus 202 uses three powder constituents 106 and, thus, includes three constituent reservoirs 230 and three constituent regulators 232 associated with corresponding ones of the powder constituents 106. However, in other examples, the powder-deposition apparatus 202 may use any number of powder constituents 106-N and, thus, include any number of constituent reservoirs 230-N and constituent regulators 232-N associated with corresponding ones of the powder constituents 106-N (FIGS. 7 and 8).

As illustrated in FIG. 8, in one or more examples, each one, or a select one, of the powder constituents 106 is selectively dispensed from the powder feeder 208, such as from an associated one the constituent reservoirs 230, to the mixer 206 to produce a first mass (e.g., first quantity) of the powder 102. The first mass of the powder 102 is equal to the predetermined mass of the powder 102 that is required to form an entirety of the first powder layer 104-1.

The powder 102 includes at least one of the powder constituents 106 and has a first composition that corresponds to the composition of the first powder layer 104-1. For example, the predetermined mass of each one of the powder constituents 106 is selectively dispensed to produce the first mass of the powder 102 having the first composition. As an illustrative example, a first mass of the first powder constituent 106-1 and a first mass of the second powder constituent 106-2 are dispensed and mixed to produce the first mass of the powder 102 having the first composition formed by a first compositional ratio of the first powder constituent 106-1 and the second powder constituent 106-2.

The first mass of the powder 102 is then dispensed from the mixer 206 to the recoater 204. The first mass of the powder 102 is then discharged from the recoater 204 of to form an entirety of the first powder layer 104-1. A portion of the powder 102 forming the first powder layer 104-1 is joined (e.g., fused or bonded) to form the first object layer 112-1 (FIG. 9) that has a first composition.

As illustrated in FIG. 9, in one or more examples, each one, or a select one, of the powder constituents 106 is selectively dispensed from the powder feeder 208, such as from an associated one the constituent reservoirs 230, to the mixer 206 to produce a second mass (e.g., second quantity) of the powder 102. The second mass of the powder 102 is equal to the predetermined mass of the powder 102 that is required to form an entirety of the second powder layer 104-2.

The powder 102 includes at least one of the powder constituents 106 and has a second composition that corresponds to the composition of the second powder layer 104-2. For example, the predetermined mass of each one of the powder constituents 106 is selectively dispensed to produce the second mass of the powder 102 having the second composition. As an illustrative example, a second mass of the first powder constituent 106-1, a second mass of the second powder constituent 106-2, and a second mass of the third powder constituent 106-3 are dispensed and mixed to produce the second mass of the powder 102 having the second composition formed by a second compositional ratio of the first powder constituent 106-1, the second powder constituent 106-2, and the third powder constituent 106-3.

The second mass of the powder 102 is then dispensed from the mixer 206 to the recoater 204. The second mass of the powder 102 is then discharged from the recoater 204 of to form an entirety of the second powder layer 104-2. A portion of the powder 102 forming the second powder layer 104-2 is then joined (e.g., fused or bonded) to form the second object layer that has a second composition.

In one or more examples, each one, or a select one, of the powder constituents 106 is selectively dispensed from the powder feeder 208, such as from an associated one the constituent reservoirs 230, to the mixer 206 to produce a third mass (e.g., third quantity) of the powder 102. The third mass of the powder 102 is equal to the predetermined mass of the powder 102 that is required to form an entirety of the third powder layer.

The powder 102 includes at least one of the powder constituents 106 and has a third composition that corresponds to the composition of the third powder layer. For example, the predetermined mass of each one of the powder constituents 106 is selectively dispensed to produce the first mass of the powder 102 having the third composition. As an illustrative example, a third mass of the second powder constituent 106-2 and a third mass of the third powder constituent 106-3 are dispensed and mixed to produce the third mass of the powder 102 having the third composition formed by a third compositional ratio of the second powder constituent 106-2 and the third powder constituent 106-3.

The third mass of the powder 102 is then dispensed from the mixer 206 to the recoater 204. The third mass of the powder 102 is then discharged from the recoater 204 of to form an entirety of the third powder layer. A portion of the powder 102 forming the third powder layer is joined (e.g., fused or bonded) to form the third object layer that has a third composition.

The process described above and illustrated in FIGS. 8 and 9 is repeated a number of times to form the plurality of object layers 112 and, ultimately, to produce the object 100 (FIG. 5). The composition of the powder 102 forming each of the powder layers 104, the composition of each one of the powder layers 104, and the composition of each one of the object layers 112 is not limited to the example described above.

According to the method 1000 (FIG. 1), in one or more examples, the step of (block 1004) successively forming the plurality of powder layers 104 includes a step of forming a plurality of sections 110 (FIGS. 10-13) of at least one of the plurality of powder layers 104. Throughout the present disclosure, the plurality of sections 110 of any one of the powder layers 104 may be referred to individually as section 110-1 through section 110-N.

In one or more examples, the step of forming the plurality of sections 110 includes a step of depositing the powder 102 such that the plurality of sections 110 are directly adjacent to each other. Accordingly, in one or more examples, the powder-deposition apparatus 202 is configured to deposit the powder 102, using the recoater 204, such that the plurality of sections 110 are directly adjacent to (e.g., contiguous with) each other.

According to the method 1000 (FIG. 1), in one or more examples, the step of (block 1006) selectively controlling the composition of the powder 102, that forms each one of the plurality of powder layers 104, includes a step of varying, or adjusting, the compositional ratio of the plurality of powder constituents 106 being mixed to produce the powder 102 that forms a plurality of sections 110 of each one of the powder layers 104. In other words, the composition of the powder 102 varies though each one of the powder layers 104 (e.g., along the X-axis and/or the Y-axis). In these examples, each one of the plurality of powder layers 104 has a variable composition, which results in a powder gradient along at least one of the X-axis and the Y-axis. Accordingly, each one of the plurality of object layers 112 has a variable composition, which results in a compositional gradient of the object 100 (FIG. 5) along at least one of the X-axis and the Y-axis.

In these examples, the composition of the powder 102 that forms at least one of the sections 110 is different than the composition of the powder 102 that forms at least another one of the sections 110. In these examples, the step of (block 1006) selectively controlling the composition of the powder 102 includes a step of selectively controlling the composition of the powder 102 forming each one of the plurality sections 110.

In one or more examples, the composition of each one of the powder layers 104 is the same as the composition of other ones of the powder layers 104. In other words, the composition of each one the plurality of sections 110 is the same among the plurality of powder layers 104. Accordingly, the composition of each one of the object layers 112 is the same as the composition of other ones of the object layers 112.

In one or more examples, the composition of at least one of the powder layers 104 is different than the composition of at least another one of the powder layers 104, which results in a powder gradient along the Z-axis. In other words, a composition of the plurality of sections 110 of one of the plurality of powder layers 104 is different than the composition of the plurality of sections 110 of at least another one of the plurality of powder layers 104. Accordingly, the composition of at least one of the object layers 112 is different than the composition of at least another one of the object layers 112, which results in a compositional gradient of the object 100 (FIG. 5) along the Z-axis.

In one or more examples, the actual mass of the powder 102 that is produced is equal to the predetermined mass of the powder 102 that is required to form an associated one of the plurality of sections 110 of one of the plurality of powder layers 104. The compositional ratio of select ones of the plurality of powder constituents 106 is monitored and selectively controlled such that the composition of the powder 102 corresponds to a desired (e.g., predetermined) composition of the associated one of the sections 110.

In one or more examples, each one of the plurality of sections 110 of a corresponding one of the plurality of powder layers 104 is formed successively. Accordingly, in one or more examples, recoater 204 is configured such that the powder 102 is discharged to successively form each one of the plurality of sections 110 of each one of the plurality of powder layers 104.

Figure 10:
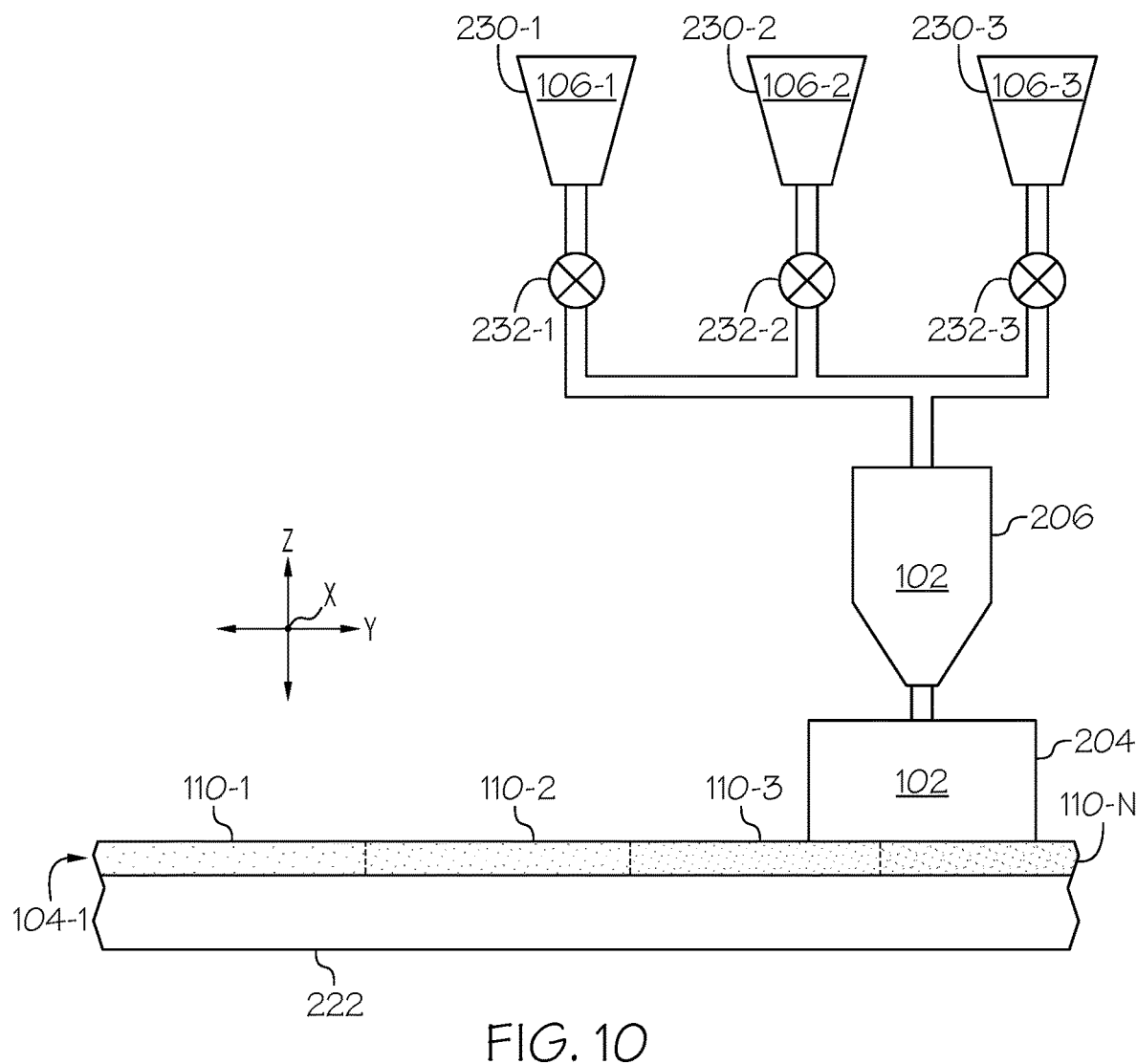
FIG. 10 is a schematic illustration of an example of the powder-deposition apparatus forming the first powder layer.
Figure 11:
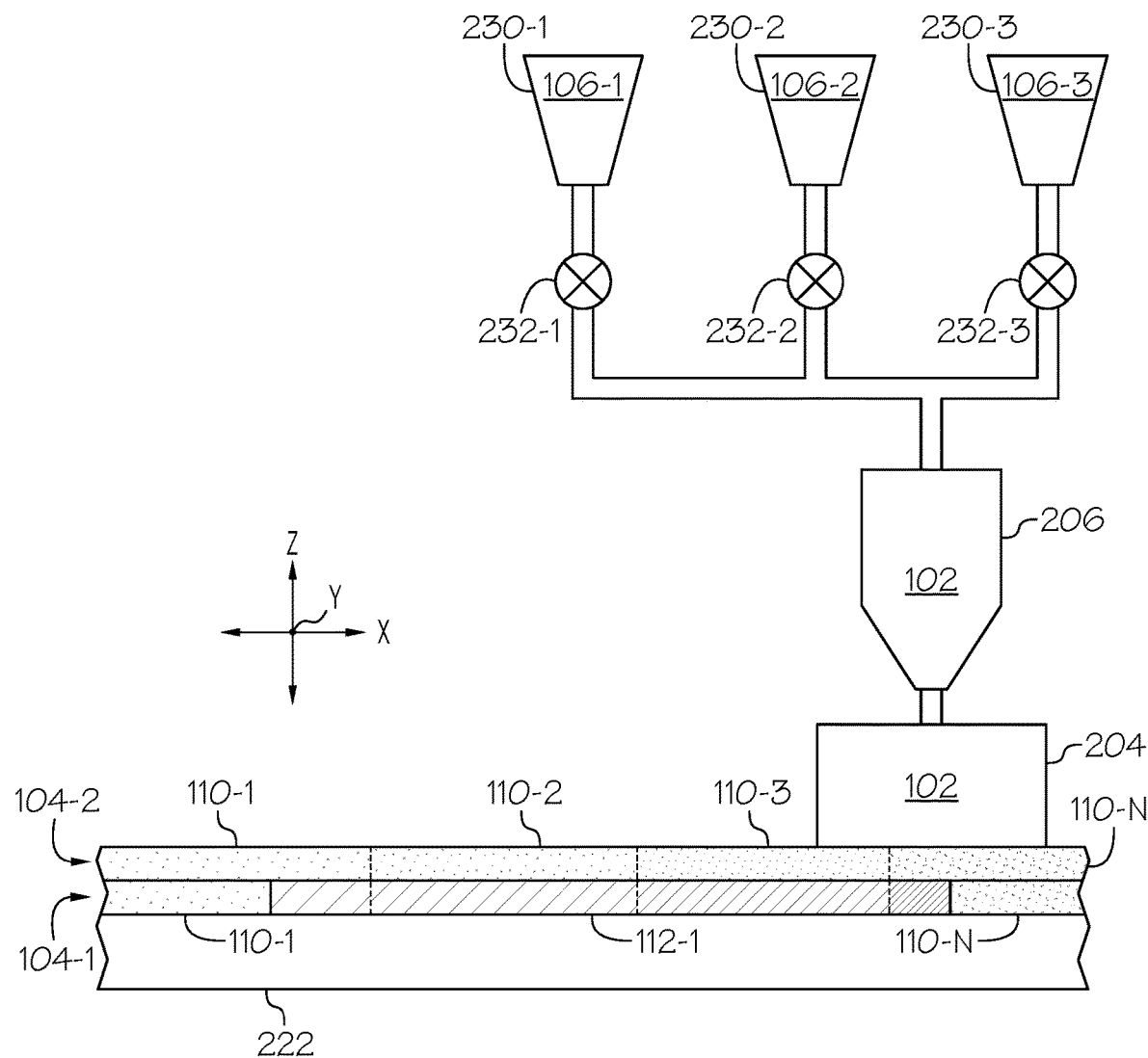
FIG. 11 is a schematic illustration of an example of the powder-deposition apparatus forming the second powder layer.

FIG. 10 schematically illustrates an example of the first powder layer 104-1 being formed on the build platform 222 using an example of the powder-deposition apparatus 202. FIG. 11 schematically illustrates an example of the second powder layer 104-2 being formed on the first powder layer 104-1 and the first object layer 112-2. In the examples illustrated in FIGS. 8 and 9, the powder-deposition apparatus 202 uses three powder constituents 106 and, thus, includes three constituent reservoirs 230 and three constituent regulators 232 associated with corresponding ones of the powder constituents 106. However, in other examples, the powder-deposition apparatus 202 may use any number of powder constituents 106-N and, thus, include any number of constituent reservoirs 230-N and constituent regulators 232-N associated with corresponding ones of the powder constituents 106-N.

As illustrated in FIG. 10, in one or more examples, each one, or a select one, of the powder constituents 106 is selectively dispensed from the powder feeder 208, such as from an associated one the constituent reservoirs 230, to the mixer 206 to produce a first mass (e.g., first quantity) of the powder 102. The first mass of the powder 102 is equal to the predetermined mass of the powder 102 that is required to form an entirety of a first section 110-1 of the first powder layer 104-1.

The powder 102 includes at least one of the powder constituents 106 and has a first composition that corresponds to the composition of the first section 110-1 of the first powder layer 104-1. For example, the predetermined mass of each one of the powder constituents 106 is selectively dispensed to produce the first mass of the powder 102 having the first composition. As an illustrative example, a first mass of the first powder constituent 106-1 and a first mass of the second powder constituent 106-2 are dispensed and mixed to produce the first mass of the powder 102 having the first composition formed by a first compositional ratio of the first powder constituent 106-1 and the second powder constituent 106-2.

The first mass of the powder 102 is then dispensed from the mixer 206 to the recoater 204. The first mass of the powder 102 is then discharged from the recoater 204 of to form the first section 110-1 (e.g., a first portion of the first powder layer 104-1).

Each one, or a select one, of the powder constituents 106 is selectively dispensed from the powder feeder 208, such as from an associated one the constituent reservoirs 230, to the mixer 206 to produce a second mass (e.g., second quantity) of the powder 102. The second mass of the powder 102 is equal to the predetermined mass of the powder 102 that is required to form an entirety of a second section 110-2 of the first powder layer 104-1.

The powder 102 includes at least one of the powder constituents 106 and has a second composition that corresponds to the composition of the second section 110-2 of the first powder layer 104-1. For example, the predetermined mass of each one of the powder constituents 106 is selectively dispensed to produce the second mass of the powder 102 having the second composition. As an illustrative example, a second mass of the first powder constituent 106-1, a second mass of the second powder constituent 106-2, and a second mass of the third powder constituent 106-3 are dispensed and mixed to produce the second mass of the powder 102 having the second composition formed by a second compositional ratio of the first powder constituent 106-1, the second powder constituent 106-2, and the third powder constituent 106-3.

The second mass of the powder 102 is then dispensed from the mixer 206 to the recoater 204. The second mass of the powder 102 is then discharged from the recoater 204 of to form the second section 110-2 (e.g., a second portion of the first powder layer 104-1).

Each one, or a select one, of the powder constituents 106 is selectively dispensed from the powder feeder 208, such as from an associated one the constituent reservoirs 230, to the mixer 206 to produce a third mass (e.g., second quantity) of the powder 102. The third mass of the powder 102 is equal to the predetermined mass of the powder 102 that is required to form an entirety of a third section 110-3 of the first powder layer 104-1.

The powder 102 includes at least one of the powder constituents 106 and has a third composition that corresponds to the composition of the third section 110-3 of the first powder layer 104-1. For example, the predetermined mass of each one of the powder constituents 106 is selectively dispensed to produce the third mass of the powder 102 having the third composition. As an illustrative example, a third mass of the second powder constituent 106-2 and a third mass of the third powder constituent 106-3 are dispensed and mixed to produce the third mass of the powder 102 having the third composition formed by a third compositional ratio of the second powder constituent 106-2 and the third powder constituent 106-3.

The third mass of the powder 102 is then dispensed from the mixer 206 to the recoater 204. The third mass of the powder 102 is then discharged from the recoater 204 of to form the third section 110-3 (e.g., a third portion of the first powder layer 104-1).

This process is repeated a number of times to form the any number of sections 110-N and, ultimately, to produce the first powder layer 104-1 A portion of the powder 102 forming the first powder layer 104-1 is then joined (e.g., fused or bonded) to form the first object layer 112-1 (FIG. 11) that has a first composition. The first composition of the first object layer 112-1 varies according to the compositions of the plurality of sections 110.

As illustrated in FIG. 11, the process described above and illustrated in FIG. 10 is repeated to form the plurality of sections 110 of the second powder layer 104-2 and to produce the second object layer. The process described above and illustrated in FIGS. 10 and 11 is repeated a number of times to form the plurality of object layers 112 and, ultimately, to produce the object 100 (FIG. 5). The composition of the powder 102 forming each one of the sections 110 of any one of the powder layers 104, the composition of each one of the sections 110, and the composition of each one of the object layers 112 is not limited to the example described above.

In one or more examples, the plurality of sections 110 of a corresponding one of the plurality of powder layers 104 is formed concurrently, or simultaneously. Accordingly, in one or more examples, recoater 204 is configured such that the powder 102 is discharged to concurrently form the plurality of sections 110 of each one of the plurality of powder layers 104.

According to the method 1000 (FIG. 1), in one or more examples, the step of (block 1018) producing the powder 102 includes a step of producing a plurality of powders 102 (FIGS. 12 and 13) of the powder 102. Throughout the present disclosure, the plurality of powders 102 of powder 102 may be referred to individually as powder 102-1 through powder 102-N. Each one of the plurality of powders 102 has a different composition that is selectively controlled. Each one of the powders 102 corresponds to and is used to form one of the sections 110 of one of the powder layers 104. In one or more examples, the composition of each one of the powders 102 corresponds to the composition of a respective one of the plurality of sections 110.

In one or more examples, the step of (block 1014) mixing the powder constituents 106 together to produce the powder 102 includes a step of mixing powder constituents 106 to form each one of the plurality of powders 102. In these examples, the composition of at least one of the powders 102 that forms at least one of the sections 110 is different than the composition of at least another one of the powders 102 that forms at least another one of the sections 110.

In one or more examples, the step of (block 1006) selectively controlling the composition of the powder 102 includes a step of selectively controlling the composition of each one of the plurality of powders 102 that form each one of the plurality of sections 110 of each one of the plurality of powder layers 104. In one or more examples, the step of selectively controlling the composition of each one of the plurality of powders 102 includes a step of segregating the plurality of powders 102 and a step of selectively controlling a compositional ratio of the powder constituents 106 being mixed to produce each one of the plurality of powders 102 (e.g., block 1016).

In one or more examples, the step of selectively controlling the compositional ratio of the powder constituents 106 forming each one of the powders 102 is performed in a manner that is substantially the same as that described herein above with respect to selectively controlling a compositional ratio of the powder constituents 106 forming the powder 102. For example, the step of selectively controlling the compositional ratio of the powder constituents 106 forming each one of the powders 102 includes a step of selectively controlling at least one of the mass and the mass flow rate of each one of plurality of powder constituents 106 being mixed to form each one of the plurality of powders 102.

Figure 12:
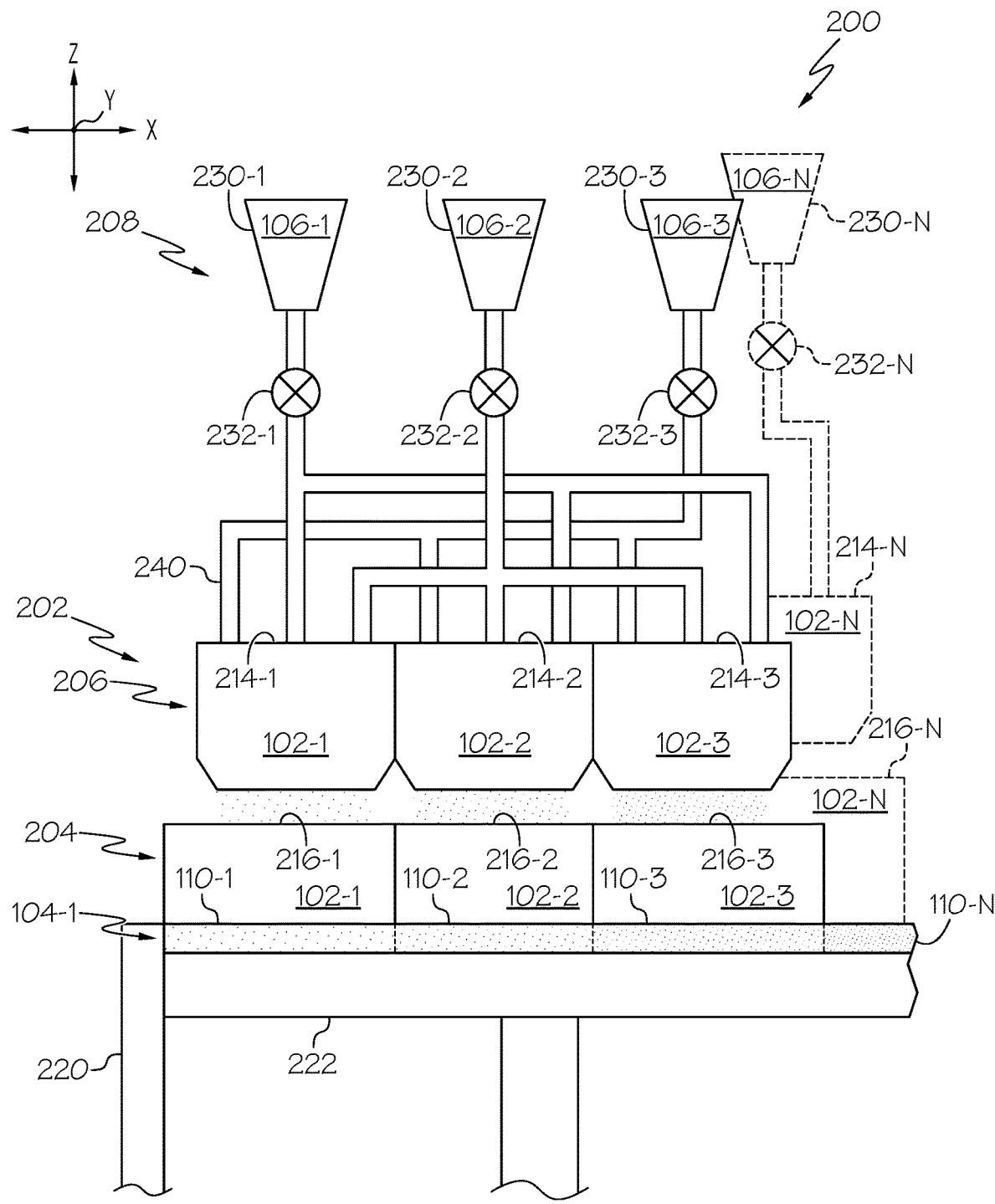
FIG. 12 is a schematic illustration of an example of the powder-deposition apparatus forming the first powder layer.
Figure 13:
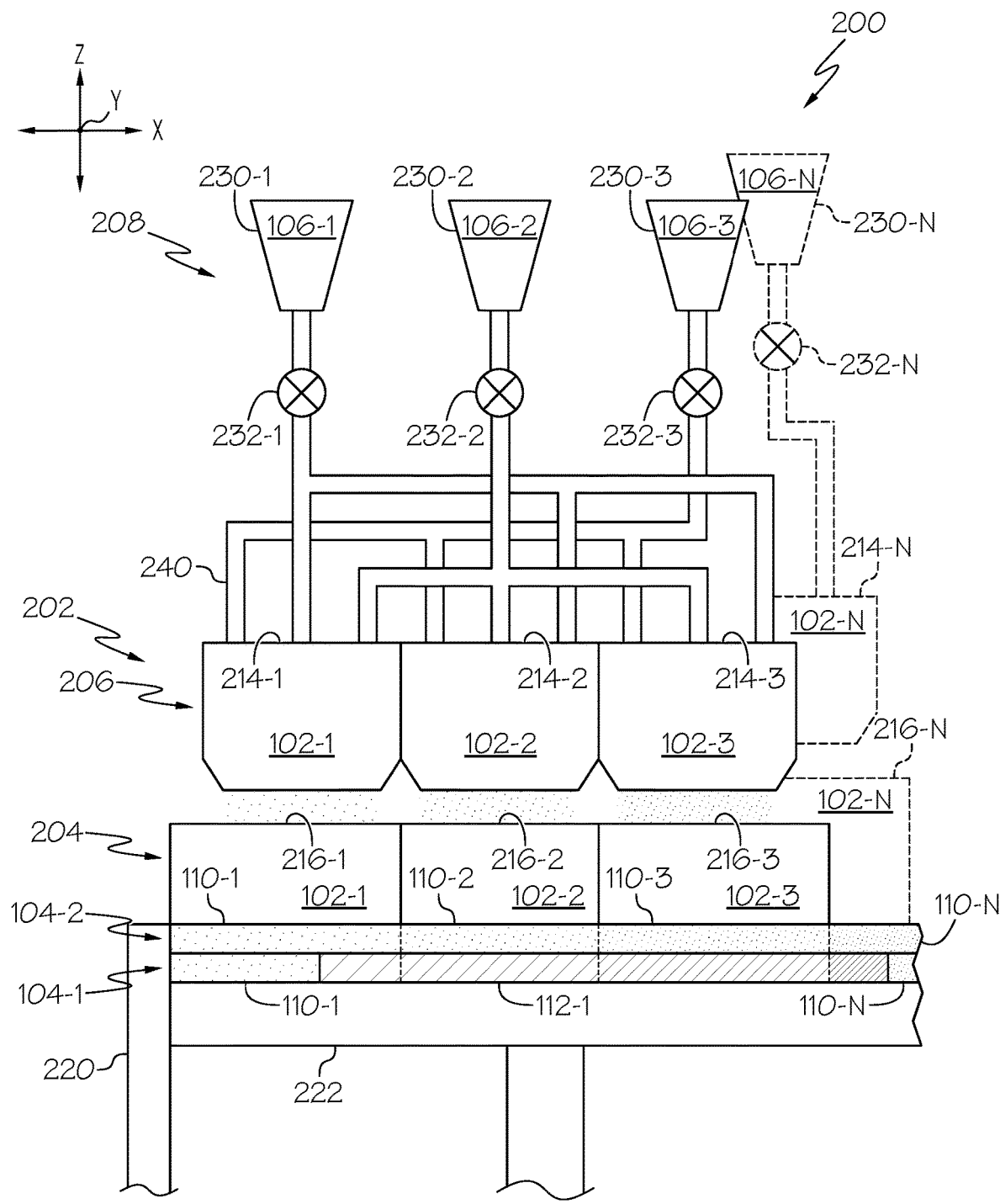
FIG. 13 is a schematic illustration of an example of the powder-deposition apparatus forming the second powder layer.

Referring to FIGS. 12 and 13, in one or more examples, the mixer 206 includes a plurality of mixing chambers 214. Throughout the present disclosure, the plurality of mixing chambers 214 may be referred to individually as mixing chamber 214-1 through mixing chamber 214-N. Each one of the plurality of mixing chambers 214 is configured to mix select ones of the powder constituents 106 such that the plurality of powders 102 is produced. While not explicitly illustrated, in one or more examples, each one of the mixing chambers 214 has an associated one of a plurality of dispensing regulators 242 that controls the flow of a corresponding one of the plurality of powders 102.

In one or more examples, the powder feeder 208 is configured to selectively dispense the predetermined mass of each one of the powder constituents 106 to each one of the plurality of mixing chambers 214 such that the composition of at least one of plurality of powders 102 is different than the composition of at least another one of the plurality of powders 102 and is selectively controlled by the mass of each one of the plurality of powder constituents 106 that is selectively dispensed from the powder feeder 208.

In one or more examples, the powder feeder 208 is configured to selectively dispense a select combination of the plurality of powder constituents 106 to each one of the plurality of mixing chambers 214 of the mixer 206 such that the mass of the plurality of powders 102 that is produced is equal to the predetermined mass of the powder 102 that is required to form an entirety of one of the powder layers 104. For example, each one of the sections 110 has a constant composition. In other words, the composition of the powder 102 forming a corresponding one of the sections 110 is the same within an entirety of the corresponding one of the sections 110, which results in a powder gradient produced in one axial direction (e.g., along one of the X-axis or the Y-axis).

In one or more examples, the powder feeder 208 is configured to selectively dispense a select combination of the plurality of powder constituents 106 to each one of the plurality of mixing chambers 214 of the mixer 206 such that the mass of the plurality of powders 102 that is produced is equal to the predetermined mass of the powder 102 that is required to form a portion of one of the powder layers 104. For example, each one of the sections 110 has a variable composition. In other words, the composition of the powder 102 forming a corresponding one of the sections 110 varies through the corresponding one of the sections 110, which results in a power gradient produced in more than one axial direction (e.g., along the X-axis and the Y-axis).

In one or more examples, the recoater 204 includes a plurality of discharge chambers 216. Throughout the present disclosure, the plurality of discharge chambers 216 may be referred to individually as discharge chamber 216-1 through discharge chamber 216-N. Each one of the plurality of mixing chambers 214 of the mixer 206 is configured to dispense one of the plurality of powders 102 to a corresponding one of the discharge chambers 216 of the recoater 204.

In one or more examples, the recoater 204 is configured to discharge each one of the plurality of powders 102 such that the plurality of sections 110 of each one of the powder layers 104 is concurrently formed directly adjacent to each other. Each one of the plurality of sections 110 is formed from one of the plurality of powders 102.

According to the method 1000 (FIG. 1), in one or more examples, the step of (block 1002) depositing the powder 102 includes a step of depositing each one of the powders 102 in the powder bed 114 to successively form each one of the plurality of powder layers 104 (e.g., block 1004). In one or more examples, the recoater 204 is configured such that the plurality of powders 102 is discharged simultaneously to concurrently form the plurality of sections 110 of each one of the plurality of powder layers 104, such as illustrated in FIGS. 12 and 13. In one or more examples, the recoater 204 is configured such that each one of the plurality of powders 102 is discharged successively to successively form the plurality of sections 110 of each one of the plurality of powder layers 104, such as illustrated in FIGS. 10 and 11.

In one or more examples, the step of selectively controlling the composition of each one of the plurality of powders 102 includes a step of varying, or adjusting, the compositional ratio of the plurality of powder constituents 106 being mixed to produce each one of the plurality of powders 102 that forms each one of the plurality of sections 110 of any one of the powder layers 104. In other words, the composition of the powder 102 varies for each one of the powder layers 104 (e.g., along the X-axis and/or the Y-axis). In these examples, each one of the plurality of powder layers 104 has a variable composition, which results in a powder gradient along at least one of the X-axis and the Y-axis. Accordingly, each one of the plurality of object layers 112 has a variable composition, which results in a compositional gradient of the object 100 (FIG. 5) along at least one of the X-axis and the Y-axis.

In these examples, the composition of at least one of the powders 102 that forms at least one of the sections 110 is different than the composition at least another one of the powders 102 that forms at least another one of the sections 110. In these examples, the step of (block 1006) selectively controlling the composition of the powder 102 includes a step of selectively controlling the composition of the powder 102 forming each one of the plurality sections 110.

In one or more examples, the composition of each one of the powder layers 104 is the same. In other words, the composition of each one the plurality of sections 110, formed by one of the powders 102, is the same among the plurality of powder layers 104. Accordingly, the composition of each one of the object layers 112 is the same.

In one or more examples, the composition of at least one of the powder layers 104 is different than the composition of at least another one of the powder layers 104, which results in a powder gradient along the Z-axis. In other words, a composition of the plurality of sections 110, formed by the plurality of powders 102, of one of the plurality of powder layers 104 is different than the composition of the plurality of sections 110, formed by the plurality of powders 102, of at least another one of the plurality of powder layers 104. Accordingly, the composition of at least one of the object layers 112 is different than the composition of at least another one of the object layers 112, which results in a compositional gradient of the object 100 (FIG. 5) along the Z-axis.

FIG. 12 schematically illustrates an example of the first powder layer 104-1 being formed on the build platform 222 using an example of the powder-deposition apparatus 202. FIG. 13 schematically illustrates an example of the second powder layer 104-2 being formed on the first powder layer 104-1 and the first object layer 112-2. In the examples illustrated in FIGS. 12 and 13, the powder-deposition apparatus 202 uses three of the powder constituents 106 to form three of the sections 110 of each one of the powder layers 104 and, thus, includes three constituent reservoirs 230 and three constituent regulators 232 associated with corresponding ones of the powder constituents 106. However, in other examples, the powder-deposition apparatus 202 may use any number of powder constituents 106-N to form any number of sections 110-N and, thus, include any number of constituent reservoirs 230-N and constituent regulators 232-N associated with corresponding ones of the powder constituents 106-N (FIGS. 7 and 8).

As illustrated in FIG. 12, in one or more examples, each one, or a select one, of the powder constituents 106 is selectively dispensed from the powder feeder 208, such as from an associated one the constituent reservoirs 230, to the first mixing chamber 214-1 to produce a first mass (e.g., first quantity) of the first powder 102-1. Each one, or a select one, of the powder constituents 106 is selectively dispensed from the powder feeder 208, such as from an associated one the constituent reservoirs 230, to the second mixing chamber 214-2 to produce a second mass (e.g., second quantity) of the second powder 102-2. Each one, or a select one, of the powder constituents 106 is selectively dispensed from the powder feeder 208, such as from an associated one the constituent reservoirs 230, to the third mixing chamber 214-3 to produce a third mass (e.g., third quantity) of the third powder 102-3.

The first mass of the first powder 102-1 is equal to the predetermined mass of the powder 102 that is required to form an entirety of, or a portion of, the first section 110-1 of the first powder layer 104-1. The second mass of the second powder 102-2 is equal to the predetermined mass of the powder 102 that is required to form an entirety of, or a portion of, the second section 110-2 of the first powder layer 104-1. The third mass of the third powder 102-3 is equal to the predetermined mass of the powder 102 that is required to form an entirety of, or a portion of, the third section 110-3 of the first powder layer 104-1.

The first powder 102-1 includes at least one of the powder constituents 106 and has a first composition that corresponds to the composition of the first section 110-1 of the first powder layer 104-1. For example, the predetermined mass of each one of the powder constituents 106 is selectively dispensed to produce the first mass of the first powder 102-1 having the first composition. As an illustrative example, a first mass of the first powder constituent 106-1 and a first mass of the second powder constituent 106-2 are dispensed and mixed to produce the first mass of the first powder 102-1 having the first composition formed by a first compositional ratio of the first powder constituent 106-1 and the second powder constituent 106-2.

The second powder 102-2 includes at least one of the powder constituents 106 and has a second composition that corresponds to the composition of the second section 110-2 of the first powder layer 104-1. For example, the predetermined mass of each one of the powder constituents 106 is selectively dispensed to produce the second mass of the second powder 102-2 having the second composition. As an illustrative example, a second mass of the first powder constituent 106-1, a second mass of the second powder constituent 106-2, and a second mass of the third powder constituent 106-3 are dispensed and mixed to produce the second mass of the second powder 102-2 having the second composition formed by a second compositional ratio of the first powder constituent 106-1, the second powder constituent 106-2, and the third powder constituent 106-3.

The third powder 102-3 includes at least one of the powder constituents 106 and has a third composition that corresponds to the composition of the third section 110-3 of the first powder layer 104-1. For example, the predetermined mass of each one of the powder constituents 106 is selectively dispensed to produce the third mass of the second powder 102-2 having the third composition. As an illustrative example, a third mass of the second powder constituent 106-2 and a third mass of the third powder constituent 106-3 are dispensed and mixed to produce the third mass of the third powder 102-3 having the third composition formed by a third compositional ratio of the second powder constituent 106-2 and the third powder constituent 106-3.

The first mass of the first powder 102-1, the second mass of the second powder 102-2, and the third mass of the third powder 102-3 are then dispensed from a respective one of the first mixing chamber 214-1, the second mixing chamber 214-2, and the third mixing chamber 214-3 of the mixer 206 to a corresponding one of the first discharge chamber 216-1, the second discharge chamber 216-2, and the third discharge chamber 216-3 of the recoater 204. The first mass of the first powder 102-1, the second mass of the second powder 102-2, and the third mass of the third powder 102-3 are then discharged from a respective one of the first discharge chamber 216-1, the second discharge chamber 216-2, and the third discharge chamber 216-3 of the recoater 204 to form a corresponding one of the first section 110-1, the second section 110-2, and the third section 110-3 to produce the first powder layer 104-1.

A portion of the powder 102 forming the first powder layer 104-1 is then joined (e.g., fused or bonded) to form the first object layer 112-1 (FIG. 11) that has a first composition. The first composition of the first object layer 112-1 varies according to the compositions of the plurality of sections 110.

As illustrated in FIG. 13, the process described above and illustrated in FIG. 12 is repeated to form the plurality of sections 110 of the second powder layer 104-2 and to produce the second object layer. The process described above and illustrated in FIGS. 12 and 13 is repeated a number of times to form the plurality of object layers 112 and, ultimately, to produce the object 100 (FIG. 5). The composition of the powders 102 forming each one of the sections 110 of any one of the powder layers 104, the composition of each one of the sections 110, and the composition of each one of the object layers 112 is not limited to the example described above.

In one or more examples, the step of forming the plurality of sections 110 and the step of selectively controlling the composition of the powder 102, or the composition of each one of the powders 102, forming each one of the plurality sections 110 occur currently.

In one or more examples, the step of selectively controlling the composition of the powder 102, or the composition of each one of the powders 102, forming each one of the plurality sections 110 precedes the step of forming the plurality of sections 110.

According to the method 1000, in one or more examples, the step of (block 1018) producing the powder 102 includes a step of producing the powder 102 that has the composition associated with each one of the powder layers 104, such as producing the powders 102 that have compositions associated with the sections 110 of each one of the powder layers 104. In one or more examples, the step of (block 1018) producing the powder 102 includes a step of selectively controlling a mass of the powder 102 that is produced to form each one of the powder layers 104, such as selectively controlling a mass of each one of the powders 102 that is produced to form each one of the sections 110 of the powder layers 104, and verifying the mass of the powder 102, such as by measuring the mass and/or the mass flow rate of the powder, through real-time computational iterations and adjustments in the analytical model and equations within the controller 250. In one or more examples, the step of (block 1018) producing the powder 102 includes a step of selectively controlling a mass flow rate of the powder 102 that is produced to form each one of the powder layers 104, such as selectively controlling a mass flow rate of each one of the powders 102 that is produced to form each one of the powder layers 104. In these examples, selectively control of the mass and/or the mass flow rate of the powders 102 and, thus, the powder 102 provides control over the amount, or quantity, of the powder 102 that is produced for an associated one of the plurality of powder layers 104.

Accordingly, implementations of the additive manufacturing system 200 and method 1000 selectively control the composition of the plurality of powder layers 104 to produce a compositional powder gradient, which results in selective control of the composition of a plurality of object layers 112 to produce a compositional object gradient.

In one or more examples, the compositional powder gradient is produced through the plurality of powder layers 104, such as by selectively varying the compositional ratio of the powder constituents 106 forming the powder 102 between the plurality of powder layers 104. In these examples, the compositional object gradient is produced through the plurality of object layers 112.

In one or more examples, the compositional gradient is produced within each one of the powder layers 104, such as by selectively varying the composition ratio of the powder constituents 106 forming the powder 102 between sections 110 of each one of the powder layers 104. In these examples, the compositional object gradient is produced within each one of the object layers 112. As illustrated in FIGS. 11 and 13, each one of the object layers 112 is formed by joining the powder 102 that forms at least a portion of each one of the sections 110 of each one of the powder layers 104.

In one or more examples, the composition gradient within a given one of the powder layers 104 and, thus, the compositional gradient within a given one of the object layers 112 and the compositional gradient of the object 100 are controlled under direction from the controller 250 according to a predetermined plan stored in the controller 250.

Referring to FIG. 1, in one or more examples, the method 1000 includes a step of (block 1020) determining property-data for the object 100. In one or more examples, the property-data represents a two-dimensional distribution of at least one desired material property of the object 100 corresponding to a two-dimensional cross-sectional layer of the object 100. For example, the property-data is acquired from a three-dimensional model representing the distribution of the at least one desired material property of the object 100, which is converted into a two-dimensional layer. In one or more examples, the property data represents a three-dimensional distribution of the at least one desired material property of the object 100. For example, the property-data is acquired from the three-dimensional model representing the distribution of the at least one desired material property of the object 100, which is converted into a plurality of two-dimensional layers. In one or more examples, the method 1000 includes a step of (block 1022) determining, or generating, composition-data for the build-powder section of each one of a plurality of powder layers deposited to form the object 100. In one or more examples, the composition-data represents a two-dimensional distribution of the composition of the powder 102 forming each one of the powder layers 104. The two-dimensional distribution of the composition is mapped to the two-dimensional distribution of the at least one material property of the object 100. In these examples, the step of (block 1006) selectively controlling the compositional of the powder 102 includes a step of adjusting the compositional ratio of the powder constituents 106 according to the two-dimensional distribution of the composition of the corresponding one of the powder layers 104. In one or more examples, the composition-data represents a three-dimensional distribution of the composition of the plurality of powder layers 104 deposited to form the object 100. The three-dimensional distribution of the composition is mapped to the three-dimensional distribution of the at least one material property of the object 100. In these examples, the step of (block 1006) selectively controlling the composition of the powder 102 includes a step of adjusting the compositional ratio of the powder constituents 106 according to the three-dimensional distribution of the composition of the plurality of powder layers 104. The at least one desired material property of the object 100 includes, but is not limited to, a desired physical property, chemical property, electrical property, thermal property, and/or magnetic property within a given object layer or within the object 100.

Throughout the present disclosure, examples of the operational steps of the method 1000 and components of the additive manufacturing system 200 described with respect to depositing the powder 102 to one of the plurality of powder layers 104 and joining the powder 102 to form one of the plurality of object layers 112 are equally applicable to operational steps and components for depositing the powder 102 to form any other one of the plurality of powder layers 104 and joining the powder 102 to form any other one of the plurality of object layers 112. Furthermore, additional components, such as additional powder feeders, hoppers, regulators, valves, mass sensors, mass flow sensors, and the like may be included in the additive manufacturing system 200 without departing from the scope of the present disclosure.

As described herein, the controller 250 communicates with and/or controls various components of the additive manufacturing system 200. In one or more examples, the controller 250 is a computing device that includes a processor and memory. The memory may be a computer-readable memory medium and is configured to store data required for operation of the additive manufacturing system 200. Computer-readable memory medium is any medium which can be used to store information which can later be accessed by the processor. Computer-readable memory medium may include computer memory and data storage devices. Computer memory may be a fast-access memory and may be used to run program instructions executable by the processor. Computer memory may include random access memory (RAM), flash memory, and read-only memory (ROM). Data storage devices may be physical devices and may be used to store any information or computer program which may be accessed by the processor, such as an operating system, computer programs, program modules, and program data. Data storage devices and their associated computer-readable memory media provide storage of computer-readable instructions, data structures, program modules, and other data for the system. Data storage devices may include magnetic medium like a floppy disk, a hard disk drive, and magnetic tape; an optical medium like a Compact Disc (CD), a Digital Video Disk (DVD), and a Blu-ray Disc; and solid state memory such as random access memory (RAM), flash memory, and read only memory (ROM).

In one or more examples, the memory includes data packets comprised of data required for controlled operation of the additive manufacturing system 200. For example, one data packet may contain data required for control of the powder-deposition apparatus 202 and another data packet may contain data required for control of the powder-joining apparatus. The processor communicates with the memory to retrieve the necessary data for controlling operation of the additive manufacturing system 200.

In one or more examples, the subject matter of the present disclosure is described with reference to acts and symbolic representations of operations that are performed by one or more computers or computer systems, unless indicated otherwise. As such, it will be understood that such acts and operations, which are at times referred to as being computer-executed, include the manipulation by one or more processors of the additive manufacturing system 200, such as of the controller 250, via electrical signals representing data in a structured form. This manipulation transforms the data or maintains it at specific locations in the memory of the additive manufacturing system 200, which reconfigures or otherwise alters the operation of the additive manufacturing system 200 in a manner well understood by those skilled in the art. The data structures where data is maintained are physical locations of the memory that have particular properties defined by the format of the data. However, although one or more examples are described in the foregoing context, it is not meant to be limiting, as those skilled in the art will appreciate, in that some of the acts and operations described herein may also be implemented in hardware, software, and/or firmware and/or some combination thereof.

Figure 14:
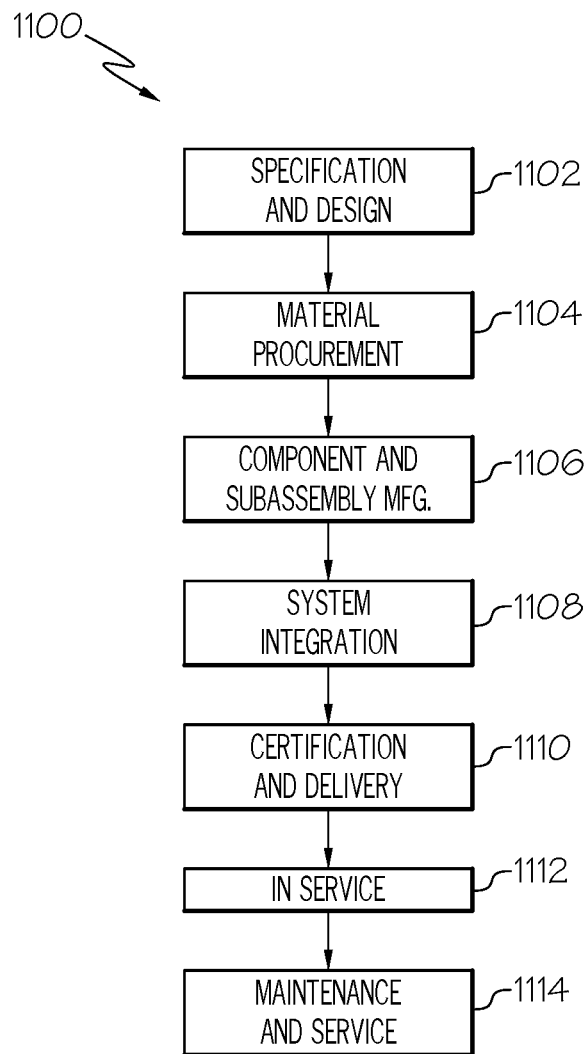
FIG. 14 is a flow diagram of an aircraft manufacturing and service methodology.
Figure 15:
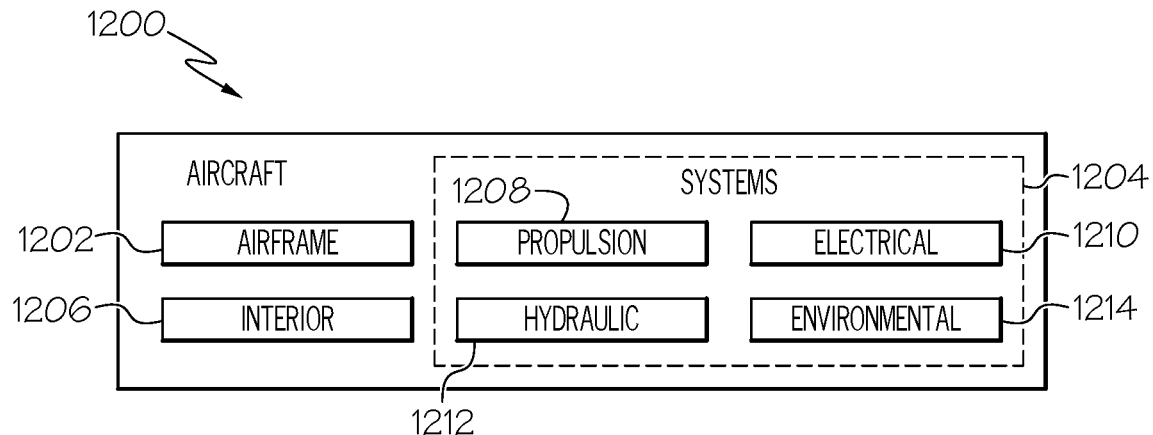
FIG. 15 is a schematic block diagram of an example of an aircraft.

Referring now to FIGS. 14 and 15 examples of the method 1000 and the additive manufacturing system 200 may be used in the context of an aircraft manufacturing and service method 1100, as shown in the flow diagram of FIG. 14 and an aircraft 1200, as schematically illustrated in FIG. 15.

Referring to FIG. 15, in one or more examples, the aircraft 1200 includes an airframe 1202, an interior 1206, and a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a guidance system, and the like. The object 100 made in accordance with the method 1000, and using the additive manufacturing system 200, may be a structure, an assembly, a sub-assembly, a component, a part, or any other portion of the aircraft 1200, such as a portion of the airframe 1202 or the interior 1206.

Referring to FIG. 14 during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 14 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the method 1000 and the additive manufacturing system 200 shown and described herein may be employed during any one or more of the stages of the manufacturing and service method 1100 shown in the flow diagram illustrated by FIG. 14. In an example, implementation of the disclosed the method 1000 and the additive manufacturing system 200 may form a portion of component and subassembly manufacturing (block 1106) and/or system integration (block 1108). For example, assembly of the aircraft 1200 and/or components thereof using implementations of the disclosed the method 1000 and the additive manufacturing system 200 may correspond to component and subassembly manufacturing (block 1106) and may be prepared in a manner similar to components or subassemblies prepared while the aircraft 1200 is in service (block 1112). Also, implementations of the disclosed the method 1000 and the additive manufacturing system 200 may be utilized during system integration (block 1108) and certification and delivery (block 1110). Similarly, implementations of the disclosed the method 1000 and the additive manufacturing system 200 may be utilized, for example and without limitation, while the aircraft 1200 is in service (block 1112) and during maintenance and service (block 1114).

Although an aerospace (e.g., aircraft or spacecraft) example is shown, the examples and principles disclosed herein may be applied to other industries, such as the automotive industry, the construction industry, the wind turbine industry, the electronics industry, and other design and manufacturing industries. Accordingly, in addition to aircraft and spacecraft, the examples and principles disclosed herein may apply to powder bed additive manufacturing processes used to form objects used with other vehicles (e.g., land vehicles, marine vehicles, construction vehicles, etc.), machinery, and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy. For example, the term "approximately" refers to a condition that is within 10% of the stated condition. However, the term "approximately" does not exclude a condition that is exactly the stated condition.

Those skilled in the art will appreciate that some of the elements, features, and/or components described and illustrated in FIGS. 2-13 and 15, referred to above, may be combined in various ways without the need to include other features described and illustrated in FIGS. 2-13 and 15, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 2-13 and 15, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Additionally, those skilled in the art will appreciate that not all elements described and illustrated in FIGS. 2-13 and 15, referred to above, need be included in every example and not all elements described herein are necessarily depicted in each illustrative example.

In FIGS. 1 and 14, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 1 and 14, referred to above, and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the method 1000 and the additive manufacturing system 200 have been shown and described, modifications may occur to those skilled in the art upon reading the specification. The present application includes such modifications and is limited only by the scope of the claims.

What is claimed is:

1. A method of additively manufacturing an object, the method comprising steps of:
   measuring a mass for each one of a plurality of powder constituents to produce a powder comprising a compositional ratio;
   measuring a mass flow rate for the powder to verify the compositional ratio;
   depositing the powder to form a powder layer;
   while depositing the powder, selectively varying the mass for at least one of the plurality of powder constituents to vary the compositional ratio such that the powder layer comprises a continuous compositional gradient along at least one of an X-axis and a Y-axis;
   measuring the mass flow rate for the powder to verify the compositional ratio, as modified by the varying of the mass, while depositing the powder to form the powder layer;
   and
   joining at least a portion of the powder layer to form an object layer of the object, wherein the object layer comprises a functional gradient along at least one the X-axis and the Y-axis.

2. The method of claim 1, further comprising:
   measuring the mass for each one of the plurality of powder constituents to produce the powder comprising the compositional ratio associated with each one of a plurality of successive powder layers;
   measuring the mass flow rate for the powder to verify the compositional ratio associated with each one of the plurality of successive powder layers;
   depositing the powder to form each one of the plurality of successive powder layers;
   while depositing the powder to form each one of the plurality of successive powder layers, selectively varying the mass for at least one of the plurality of powder constituents to vary the compositional ratio such that each one of the plurality of successive powder layers comprises the continuous compositional gradient along at least one of the X-axis and the Y-axis and the plurality of successive powder layers comprises a constant composition along a Z-axis;

while depositing the powder to form each one of the plurality of successive powder layers, measuring the mass flow rate for the powder to verify the compositional ratio as modified by the varying of the mass; and joining at least a portion of each one of a plurality of successive object layers before forming each successive one of the plurality of successive powder layers, wherein the object comprises the functional gradient along at least one the X-axis and the Y-axis.

3. The method of claim 1, further comprising:

measuring the mass for each one of the plurality of powder constituents to produce the powder comprising the compositional ratio associated with each one of a plurality of successive powder layers;

measuring the mass flow rate for the powder to verify the compositional ratio associated with each one of the plurality of successive powder layers;

depositing the powder to form each one of the plurality of successive powder layers;

while depositing the powder to form each one of the plurality of successive powder layers, selectively varying the mass for at least one of the plurality of powder constituents to vary the compositional ratio such that each one of the plurality of successive powder layers comprises the continuous compositional gradient along at least one of the X-axis and the Y-axis and the plurality of successive powder layers comprises a compositional gradient along a Z-axis;

while depositing the powder to form each one of the plurality of successive powder layers, measuring the mass flow rate for the powder to verify the compositional ratio as modified by the varying of the mass; and joining at least a portion of each one of a plurality of successive object layers before forming each successive one of the plurality of successive powder layers, wherein the object comprises the functional gradient along at least one the X-axis and the Y-axis and along the Z-axis.

4. The method of claim 1, further comprising:

determining property data for the object layer representing a distribution of at least one material property of the object layer along at least one of the X-axis and the Y-axis; and determining compositional data for the powder corresponding to property data, wherein the mass for at least the one of the plurality of powder constituents is selectively varied such that compositional ratio of the powder corresponds to the compositional data.

5. The method of claim 4, further comprising mapping the compositional data to the property data along the X-axis and the Y-axis.

6. The method of claim 1, wherein the compositional ratio of the powder is selectively controlled such that the powder layer comprises the continuous compositional gradient along the X-axis and the Y-axis.

7. A method of additively manufacturing an object, the method comprising steps of:

determining property data for the object representing a distribution of at least one material property of the object along at least one of an X-axis, a Y-axis, and a Z-axis;

determining compositional data for a powder corresponding to at least the one material property of the object;

depositing the powder to successively form a plurality of powder layers;

while depositing the powder to successively form the plurality of powder layers, selectively controlling a compositional ratio of the powder, corresponding to the compositional data, such that each one of the plurality of powder layers comprises a compositional gradient along at least one of the X-axis, the Y-axis, and the Z-axis;

while depositing the powder to successively form the plurality of powder layers, verifying the compositional ratio of the powder as modified; and joining at least a portion of each one of the plurality of powder layer to successively form a plurality of object layers of the object, wherein the object comprises a functional gradient along at least one the X-axis, the Y-axis, and the Z-axis corresponding to the distribution of at least the one material property.

8. The method of claim 7, further comprising steps of:

measuring a mass of each one of a plurality of powder constituents corresponding to the compositional ratio; and mixing the plurality of powder constituents to produce the powder comprising the compositional ratio corresponding to the compositional data.

9. The method of claim 8, further comprising a step of measuring a mass flow rate for each one of the plurality of powder constituents before mixing the plurality of powder constituents to produce the powder.

10. The method of claim 9, further comprising a step of measuring a mass flow rate for the powder after mixing the plurality of powder constituents and while depositing the powder to successively form the plurality of powder layers.

11. The method of claim 7, wherein the step of selectively controlling the compositional ratio of the powder comprises selectively varying a mass for each one of a plurality of powder constituents to produce the powder comprising the composition ratio corresponding to the compositional data.

12. The method of claim 7, wherein the step of verifying the compositional ratio of the powder comprises measuring a mass flow rate for the powder as modified by the selectively varying of the mass.

13. The method of claim 8, further comprising a step of measuring a mass flow rate for the powder after mixing the plurality of powder constituents and while depositing the powder to successively form the plurality of powder layers.

14. The method of claim 13, wherein step of measuring a mass flow rate is performed using a mass flow sensor of a dispensing regulator associated with powder.

15. The method of claim 8, wherein the step of measuring the mass is performed using a mass sensor of a constituent regulator associated with each one of the plurality of powder constituents.

16. The method of claim 9, wherein the step of measuring the mass flow is performed using a mass flow sensor of a constituent regulator associated with each one of the plurality of powder constituents.

17. A method for additively manufacturing an object layer of an object, the method comprising steps of:

mixing, in a mixing chamber, a plurality of powder constituents to produce a powder comprising a compositional ratio;

feeding the powder from the mixing chamber to a discharge chamber;

depositing the powder from the discharge chamber to form a powder layer;

while depositing the powder, selectively controlling the compositional ratio of the powder by selectively varying a mass of at least one the plurality of powder constituents being mixed in the mixing chamber and fed to the discharge chamber, such that the powder layer comprises a continuous compositional gradient along at least one of an X-axis and a Y-axis;

while depositing the powder from the discharge chamber, verifying the compositional ratio of the powder being fed from the mixing chamber to the discharge chamber; and joining at least a portion of the powder layer to form the object layer of the object, wherein the object layer comprises a functional gradient along at least one the X-axis and the Y-axis.

18. The method of claim 17, wherein the step of verifying the compositional ratio of the powder comprises measuring a mass flow of the powder while the powder is being fed from the mixing chamber to the discharge chamber.

19. The method of claim 17, wherein the step of verifying the compositional ratio of the powder comprises measuring a mass flow of each one of the plurality of powder constituents being provided to the mixing chamber.

20. The method of claim 17, further comprising:

determining property data for the object layer representing a distribution of at least one material property of the object layer along at least one of the X-axis and the Y-axis; and determining compositional data for the powder corresponding to property data, wherein the mass for at least the one of the plurality of powder constituents is selectively varied such that compositional ratio of the powder corresponds to the compositional data.

* * * * *